United States Patent [19]

Folino

[11] Patent Number: 5,312,306

[45] Date of Patent: May 17, 1994

[54] SPEED CONVERTER

[75] Inventor: Frank A. Folino, Westin, Mass.

[73] Assignee: Synkinetics, Inc., Lexington, Mass.

[21] Appl. No.: 670,263

[22] Filed: Mar. 14, 1991

[51] Int. Cl.$^5$ ............................................. F16H 13/08
[52] U.S. Cl. ........................................ 475/196; 476/36
[58] Field of Search ............... 74/63, 202, 206, 216.3, 74/465; 475/183, 196; 476/36, 67, 68

[56] References Cited

U.S. PATENT DOCUMENTS

| | | | |
|---|---|---|---|
| 2,512,272 | 6/1950 | Gull | 74/63 |
| 3,039,324 | 6/1962 | Waterfield | 74/63 X |
| 3,049,019 | 8/1962 | LaPointe et al. | 74/202 |
| 3,468,175 | 9/1969 | Rabek | 74/63 |
| 3,807,243 | 4/1974 | Yada | 74/63 |
| 4,584,904 | 4/1986 | Distin, Jr. et al. | 74/63 X |
| 4,643,047 | 2/1987 | Distin et al. | 74/63 X |
| 4,960,003 | 10/1990 | Hartley | 74/63 |
| 5,016,487 | 5/1991 | Bollmann | 74/206 |

FOREIGN PATENT DOCUMENTS

| | | | |
|---|---|---|---|
| 24020 | 2/1922 | France | 74/63 |
| 1021945 | 2/1953 | France | 74/63 |
| 59-133863 | 8/1984 | Japan | 475/196 |
| 59-180153 | 10/1984 | Japan | 74/63 |
| 0168954 | 9/1985 | Japan | 475/196 |
| 629387 | 9/1978 | U.S.S.R. | 74/206 |
| 1257331 | 9/1986 | U.S.S.R. | 475/196 |
| 1368545 | 1/1988 | U.S.S.R. | 475/196 |
| 1399548 | 5/1988 | U.S.S.R. | 475/196 |
| 1490362 | 6/1989 | U.S.S.R. | 74/206 |
| 1569470 | 6/1990 | U.S.S.R. | 475/196 |

OTHER PUBLICATIONS

Mechanical Engineering and Technology Guide, Balls Reduce Speed and Transmit Torque.
Dojen ™ Precision Rotary Actuator Designer's Guide, Div. of Lenze, Woburn, Mass.
Soviet Engineering Research Jun. 1986, vol. 66, Issue 2, pp. 24–28.
Japanese patent, A, 60-179563, Sep. 1985, abstract.
Japanese patent, A, 60-129462, Jul. 1985, abstract.
Japanese patent, A, 2253037, Oct. 1990, abstract.
Japanese patent, A, 60-146954, Aug. 1985, abstract.
Japanese patent, A, 60-4663, Jan. 1985, abstract.

Primary Examiner—Leslie A. Braun
Assistant Examiner—Khoi Q. Ta
Attorney, Agent, or Firm—James E. Maslow

[57] ABSTRACT

A method and apparatus are provided for translating the speed of a drive shaft which is driven at a first speed to the speed of a driven shaft at a second speed, by providing a drive cam, a driven cam, and at least one reciprocating transfer element driven at a constant angular velocity and held in a slotted, fixed retainer, for interacting the two cams, such that the driven cam can be driven at the second speed by the drive cam driven at the first speed.

17 Claims, 23 Drawing Sheets

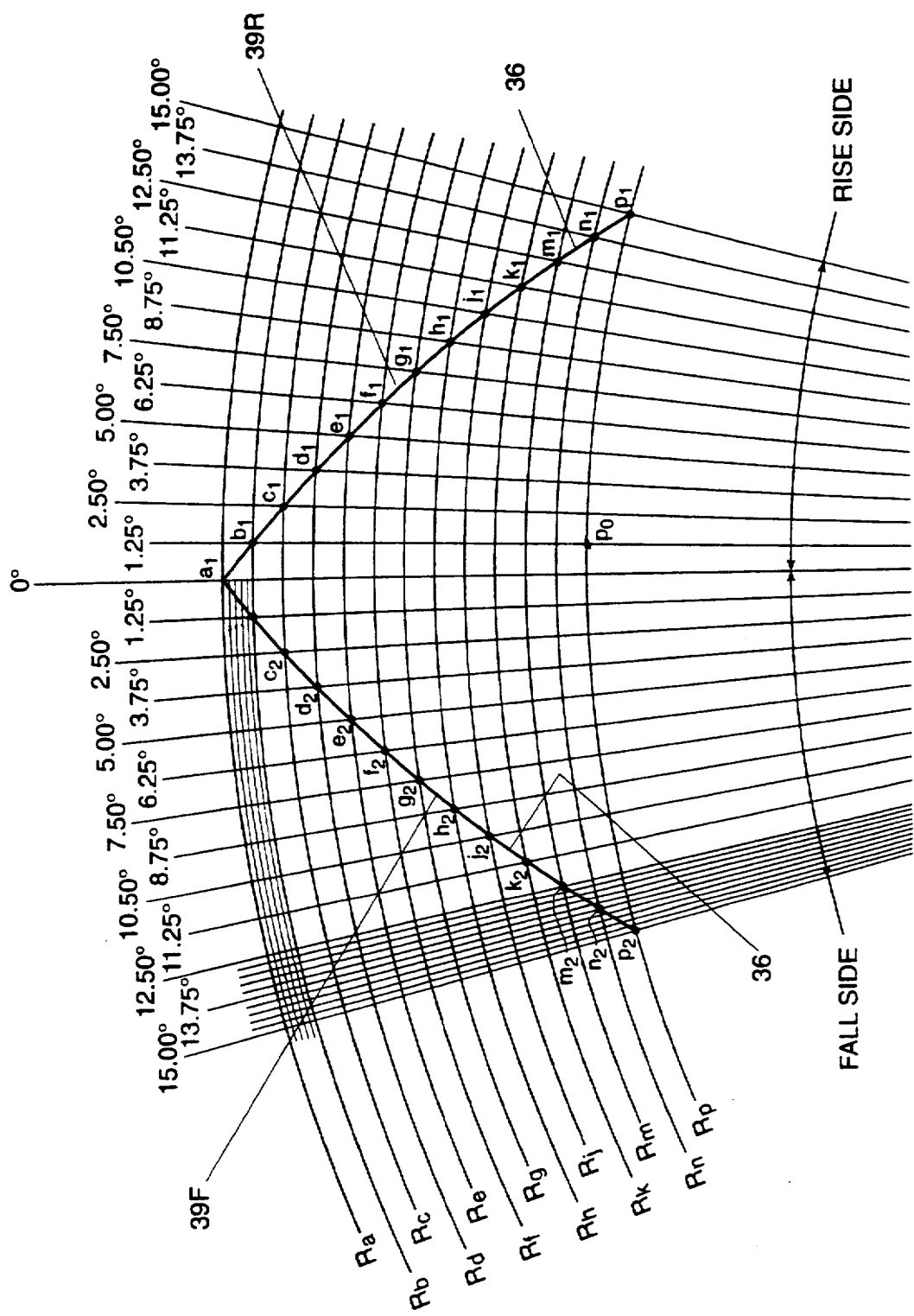

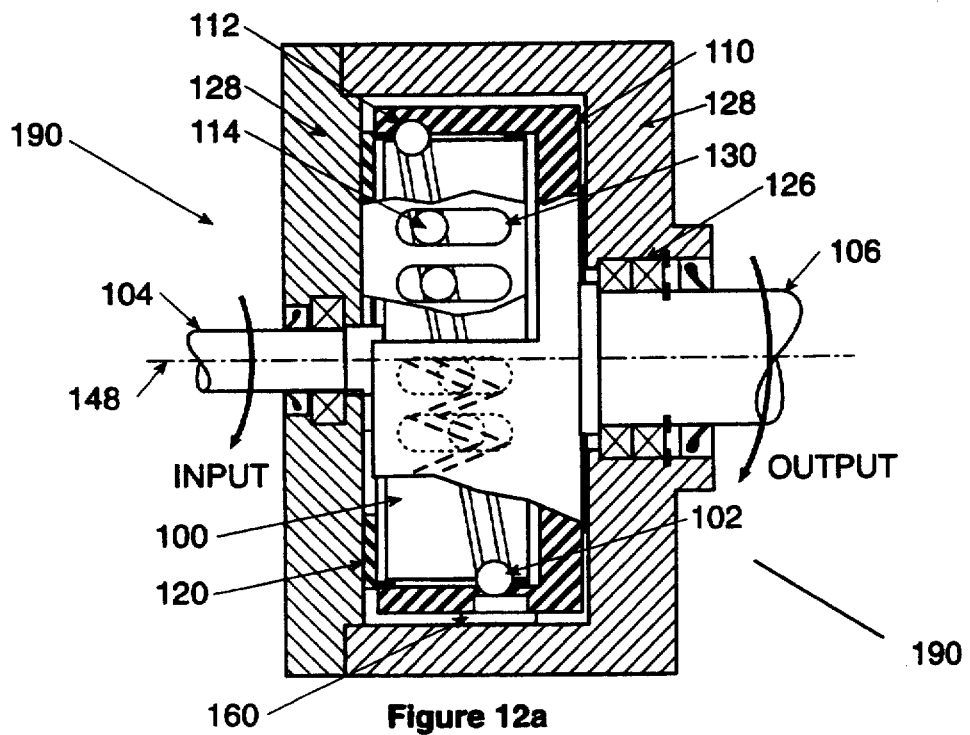
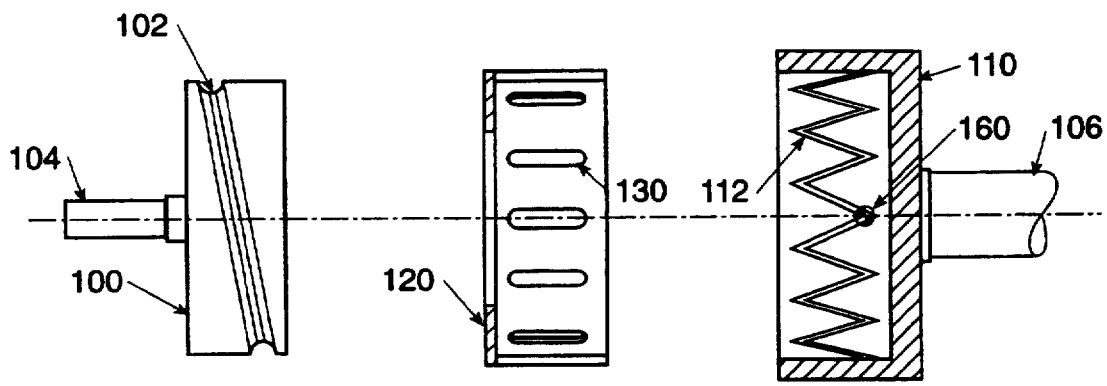
Figure 12a
Figure 12b    Figure 12c    Figure 12d

SPEED CONVERTER

BACKGROUND OF THE INVENTION

The present invention relates to mechanical power transmissions, and more particularly, to speed reducers and the like for use between a drive and driven shaft.

Speed conversion is an important capability in the efficient utilization of rotary motive force. The occasion often arises for increasing or reducing of the speed of a drive member to a higher or lower speed at a driven member. In automobiles, for example, a hydraulic transmission, with various combinations of gear assemblies, accomplishes the task of translating the high rotary speed of the gasoline engine to the lower rotational requirements at the driven axle. Typically, such transmissions are quite complex, requiring many parts to operate in sophisticated syncopation, and are quite labor intensive for both assembly and service.

Other speed conversion applications include elevators, where an electric motor typically is employed for lifting and lowering the elevator cab, and robotics, where an electric motor is employed as an actuator to effect motion. These applications often require a zero backlash arrangement so as to be able to achieve a desired level of driven member position control during operation.

It is therefore an object of the present invention to provide a speed converter which is simplified in nature but is robust in transmission capability.

It is yet another object of the present invention to provide a single stage speed converter which requires few moving parts.

It is still another object of the present invention to provide a single stage speed converter, where a plurality of single stages can be ganged to form a multi-stage speed converter.

It is a further object of the present invention to provide a speed converter having an auto braking feature.

It is another object of the present invention to provide a speed converter with zero backlash.

It is a further object of the present invention to provide a speed converter which is relatively easy to assemble and service.

It is an additional object of the present invention to provide a constant velocity speed converter design which is adaptable to a variety of applications, including automotive transmissions, elevator drives, robotic actuators, and other applications where precise and efficient speed conversion is beneficial.

It is yet an additional object of the present invention to provide load sharing among the multi-elements that transmit the rotary motive force in a speed converter.

It is another object of the present invention to provide multiple output shafts at desired output speeds with one input shaft.

SUMMARY OF THE INVENTION

These and other objects are well met by the presently disclosed, highly efficient, speed converting power transmission assembly. In one aspect of the invention, rotary motion is translated from a first to a second angular velocity, using a conjugate pair of devices rotatable about a common axis, and an oscillatable, constant angular velocity translating arrangement, interposed between the conjugate pair and also located about the common axis, for translating motion of a first of the devices at a first velocity to motion of a second of the devices at a second velocity.

In one embodiment of the invention, the first of the conjugate pair of devices is coupled to an input of the translation arrangement and the second of the devices is coupled to an output of the translation arrangement, such that motion of the first of the devices can be translated to motion of the second of the devices by the translation arrangement. The conjugate pair of devices may include a drive cam and a driven cam, having a drive shaft coupled to the drive cam and a driven shaft coupled to the driven cam. The translation arrangement may include a reaction disk axially and rotationally fixed and having at least one radially extending slot for interaction with a rolling element, or a cylindrical retainer axially and rotationally fixed and having at least one axially extending slot for interaction with a rolling element.

In another embodiment of the invention, a speed converter includes a drive member having a drive cam and a driven member having a driven cam, a plurality of transmission elements (such as balls) and an immobilized reaction disk having a plurality of slots for respective receipt of the balls, all within a common housing. The invention produces constant velocity for 360 degrees rotation at the output, with torque transmission through each of the transmission elements for 360 degrees of rotation at the output. All of the transmission elements share the load continuously, thereby decreasing the unit load on each transmission element. In one embodiment, there is zero backlash since all of the transmission elements are in contact and under preload. In another embodiment, the assembly has a self-braking feature.

In another aspect of the invention, a method is provided for translating the speed of a drive shaft which is driven at a first speed to the speed of a driven shaft at a second speed. The method includes the steps of providing a drive element having a drive cam, a driven element having a driven cam, and at least one reciprocating transfer element interacting between the two cams in a slotted fixed retainer, whereby the driven cam can be driven at the second speed by the drive cam driven at the first speed.

Preferably means are provided for axially preloading the drive cam.

In a particular high torque embodiment, parallel tracks are provided on the drive cam and on the driven cam.

BRIEF DESCRIPTION OF THE DRAWINGS

These and other features and advantages of the present invention will be more fully understood by reference to the following detailed description in conjunction with the attached drawing in which like reference numerals refer to like elements and in which:

FIG. 12(a-d) is a sectional side view of an alternative embodiment of the face cams of the present invention using cylindrical cams.

DETAILED DESCRIPTION OF A PREFERRED EMBODIMENT

Figure 1:
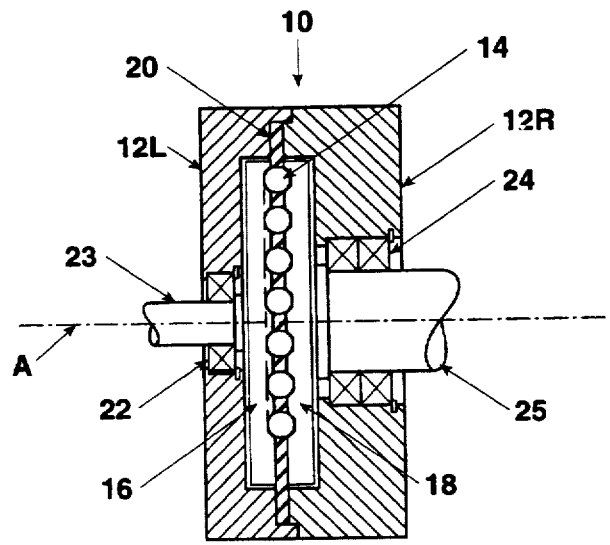
FIG. 1 is a sectional side view on the centerline of a single stage speed reducer according to an embodiment of the present invention.
Figure 2A:
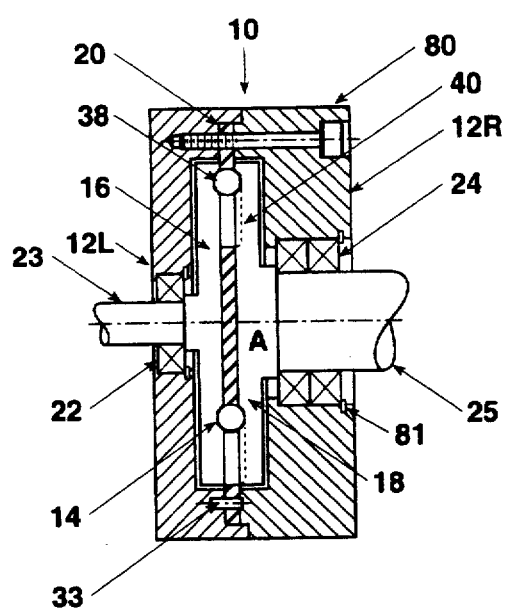
FIG. 2(a) is a sectional view on the centerline of FIG. 1, showing the top half of the reducer.
Figure 2B:
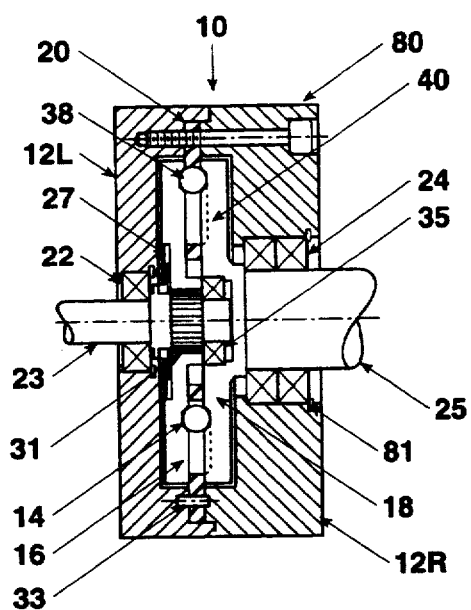
FIG. 2(b) is a sectional view on the centerline of FIG. 1 showing the top half in further detail.

A single-stage embodiment of the present invention is shown in FIG. 1, FIG. 2(a) and FIG. 2(b). Speed reducer assembly 10 includes a housing 12(L, R), a plurality of balls 14, a drive member 16 coupled to an input shaft 23, a driven member 18 coupled to an output shaft 25, and a reaction disk 20 coupled to housing 12. The drive member is mounted in housing 12 by means of an input bearing or bushing 22 and the driven member is mounted in housing 12 by means of output bearing or bushing 24. Preferably the drive member and the driven member are each symmetrical about the drive axis A.

Idler bearing 35 provides a rotary structural support for the drive cams and their shafts. This configuration couples the two shafts into a continuous shaft despite the fact that they are rotating at different speeds. Such an arrangement, as in FIG. 2(b), maintains shaft alignment and concentricity that sustains the precision performance of the reducer. The idler bearing may be eliminated, as in FIG. 2(a), by utilizing the cams and balls assembly as a bearing to maintain alignment and concentricity as well as structural shaft continuity. However, this arrangement would increase the ball and cam track loading and must be considered in determining the capacity of such a design.

An alternative embodiment of the invention is to provide preload to the cam and ball assembly. FIG. 2(b) illustrates, but is not limited to, one such arrangement. A compliant, multi-fingered leaf spring unit 27 applies an axial load to the drive cam 38, which is allowed to slide along the spline, and in turn applies an axial force to the balls against the driven cam 40. The driven cam is prevented from moving axially since its location is fixed to the housing 12, by its locked bearing. This method, or other methods of preloading, will achieve intimate and continuous contact between the cams and balls. This form of intervention will essentially eliminate axial play between the cams and balls and in turn backlash. The preloading essentially will permit tolerances to be relaxed for precision assemblies and eliminate the effect of tolerance accumulation in an assembled stack of such reducers. A further benefit of preloading is the accommodation of any wear in the elements of these units without effecting performance.

Figure 3:
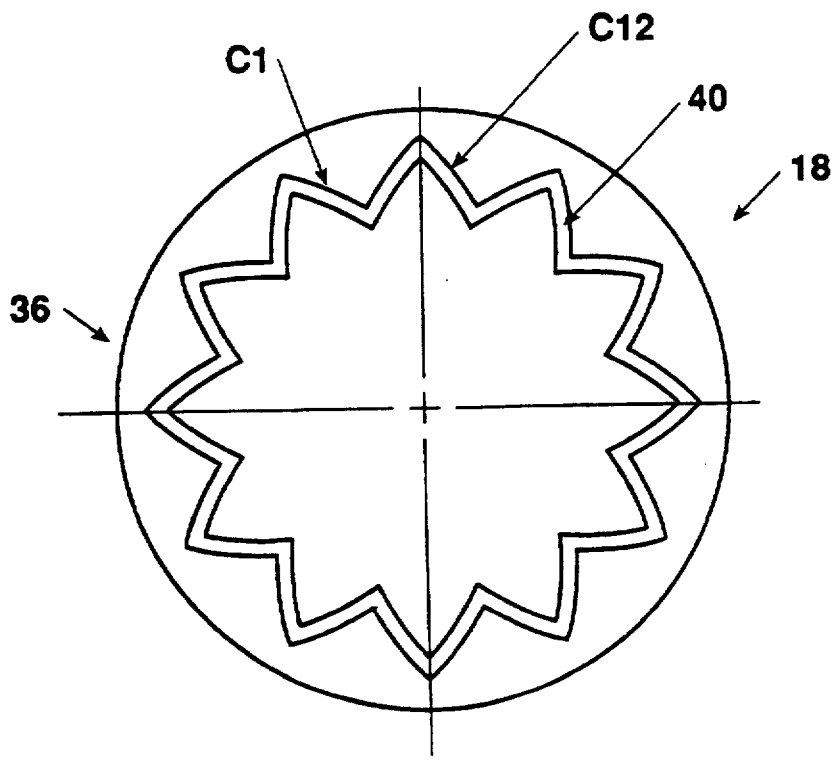
FIG. 3 is a plan view of a twelve cycle driven member face cam according to an embodiment of the present invention.

In this embodiment, the speed reducing and Power transmission capability of assembly 10 is achieved by use of appropriately designed face cams on each of the drive member and driven member. The cams are interacted by the balls. FIGS. 3(a) and 3(b) are examples of two such cams, and are shown by way of illustration and not by way of limitation of the scope of the present invention.

As seen in FIG. 3(a), drive member 16 includes a single cycle (single lobe) cam 30 which rises from $R_1$ at 0 degrees to $R_2$ at 180 degrees (defining the rise side 32 of the cam) and back to $R_1$ at 360 degrees (defining the fall side 34 of the cam). The cam is symmetric about the horizontal centerline and is generated from $R_1$ to $R_2$ in a prescribed curve relative to the center 50. The cam takes the form of a one cycle ball track 38.

As shown in FIG. 3(b), driven member 18 is preferably concentric to the shaft. In this embodiment, member 18 includes a 12 cycle (C1–C12) cam 36, taking the form of a concentric 12 cycle ball track 40. Each one of these 12 cycles accommodates the rise and fall of the single cycle drive cam, and each such accommodation rotates the driven member 1/12 of a full revolution of the driven member, in this embodiment.

Figure 4:
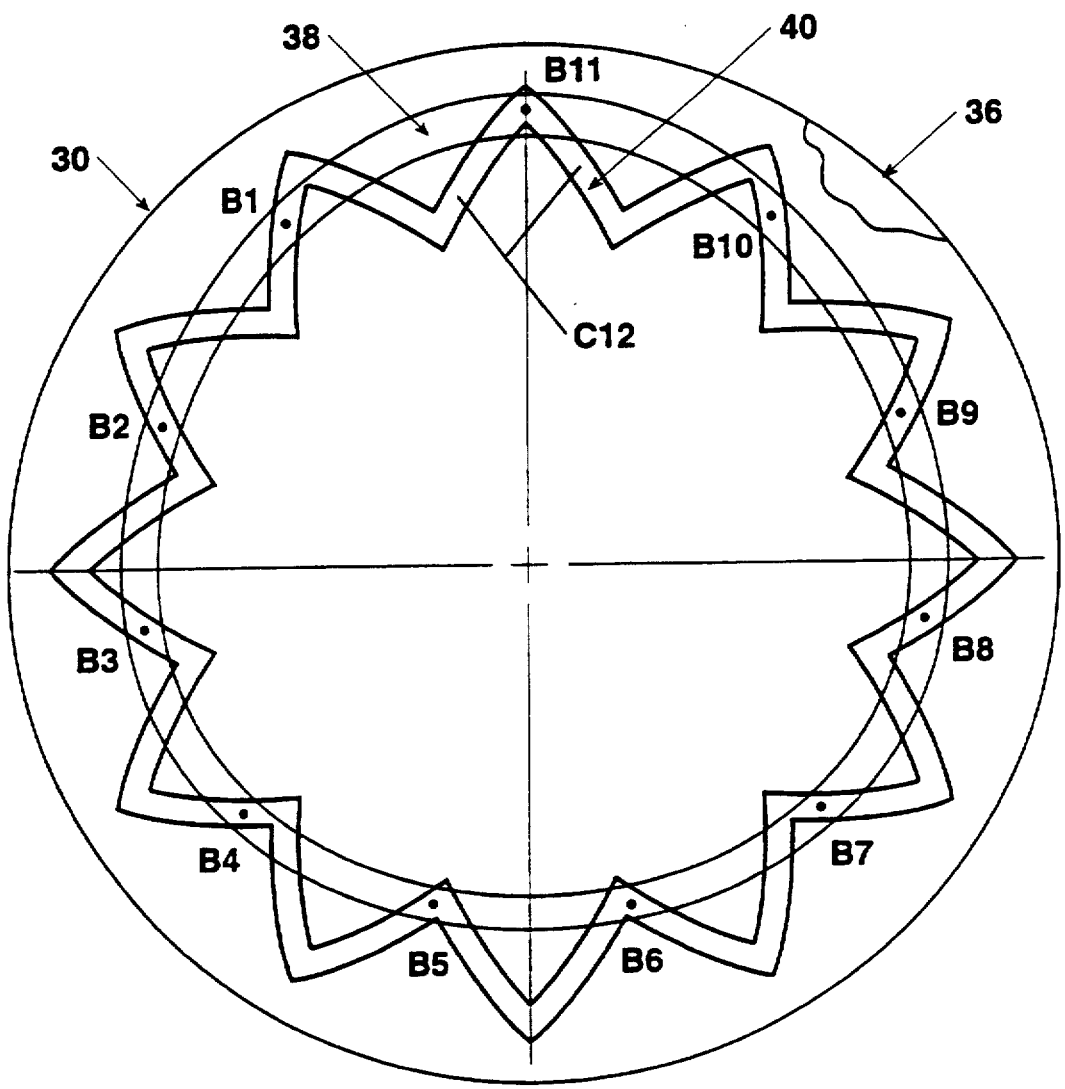
FIG. 4 is a conceptual overlay of the single cycle drive member of FIG. 3(a) and the twelve cycle driven member of FIG. 3(b).

The cooperation of the two cams of this embodiment is profiled in the overlay of FIG. 4. Cams 30 and 36, and specifically ball tracks 38, 40, are configured so as to support balls 14, FIG. 1, between them at locations B1 to B11. The balls are retained in these assigned locations by reaction disk 20, as more particularly shown in FIG. 5(a). In this embodiment, the reaction disk is provided with a plurality of radial ball travel slots S1–S11, each slot being placed equidistant, angle $\gamma$, from its nearest neighbors and from the center 50 of the retainer.

Figure 5A:
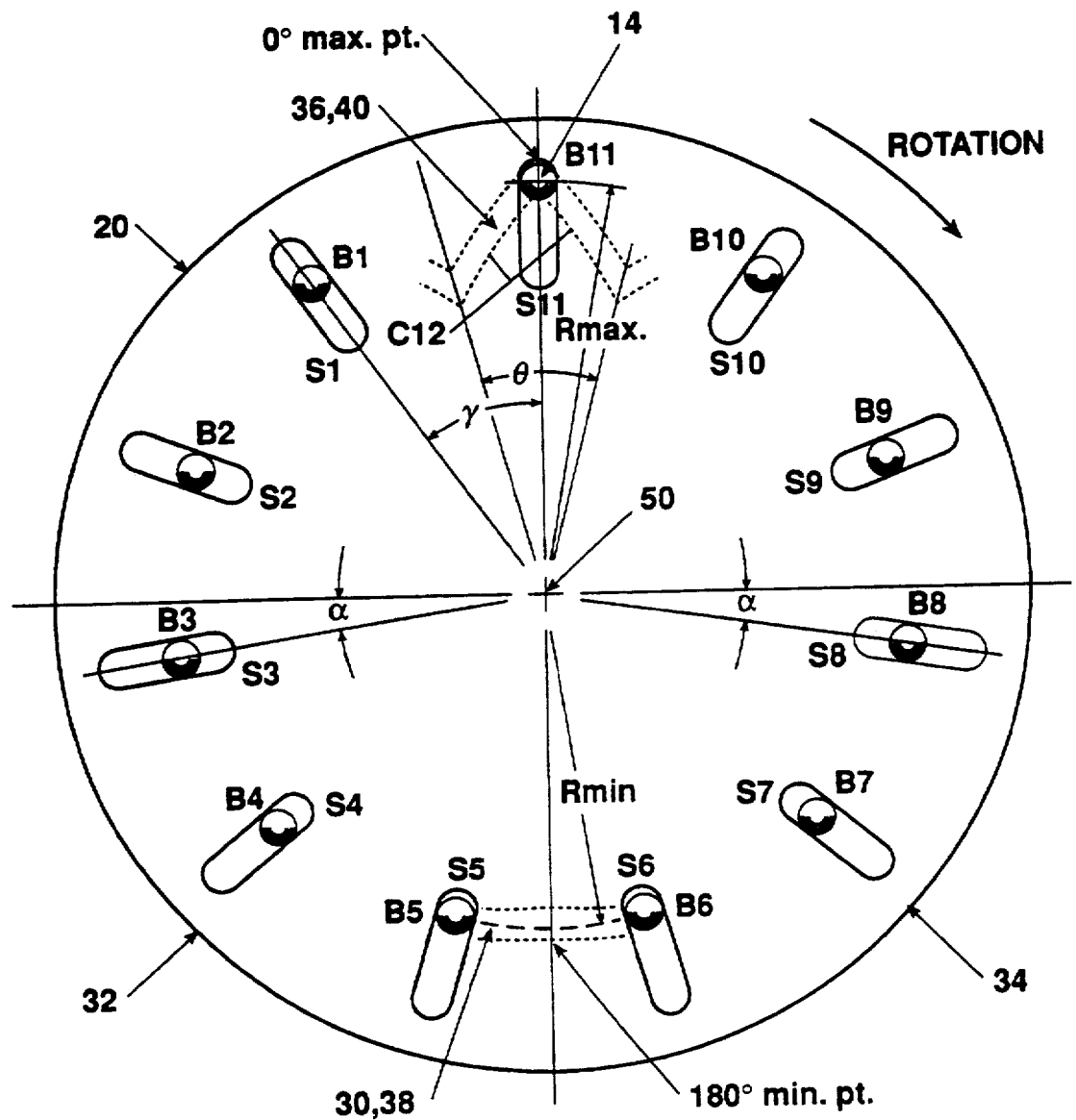
FIG. 5(a) is a plan view of a slotted reaction disk with balls installed according to the embodiment of FIGS. 1-4.

The reaction disk of FIG. 5(a) has several functions. The first is to provide a reaction to the rotary motive forces that are being transmitted through the balls. This function will be described later. The reaction disk is also utilized during the assembly procedure of the speed reducer in that it will locate and retain the balls in their proper orientation and align the cams. Thirdly, at the extreme travel of the balls in slots S1-S11, the balls are assisted in their transition from a rise mode to a fall mode and in reverse.

In operation, the balls 14 translate rotation of input shaft 23 and drive member 16, FIG. 1, in a given direction (e.g., clockwise, as viewed from the input shaft), to a lower rotation of driven member 18 and output shaft 25 in the same direction. The balls translate in and out radially during rotation of the cams. There is no angular rotation of the balls or the retainer (reaction disk 20) since they are structurally coupled, see pin 33, to the stationary housing 12, FIG. 2(a). The only rotating elements in the entire assembly are the drive and driven cams.

There are several rules that must be observed for optimal performance of the reducer. First, the number and locations of slots and balls is dependent on the number of lobes in the drive cam and the number of cycles in the driven cam. Second, the angle γ separating the ball slots must be greater than the angle θ, subtended by each of the cycles. (In this embodiment, the 12 cycle (C1-C12) cam has an angle θ equal to 30° (360/12)). Third, since only one ball can operate on each cycle of the driven cam for a given cycle of the drive cam, the maximum number of balls used must be less than the number of cycles to prevent cam lock (less than 12 balls in this embodiment). The fourth law requires the slots to be oriented according to one fixed position of the two cams relative to each other. The fifth law is that the length of the slots in the reaction disk must accommodate the rise and fall of the drive cam, which is equal to R2-R1 as a minimum. Sixth, in order to optimize load sharing and rotary motion transmission, all balls must simultaneously produce essentially the same angular rotation of the driven cam, at the appropriate speed reduction, for a given angular rotation of the drive cam.

Figure 5B:
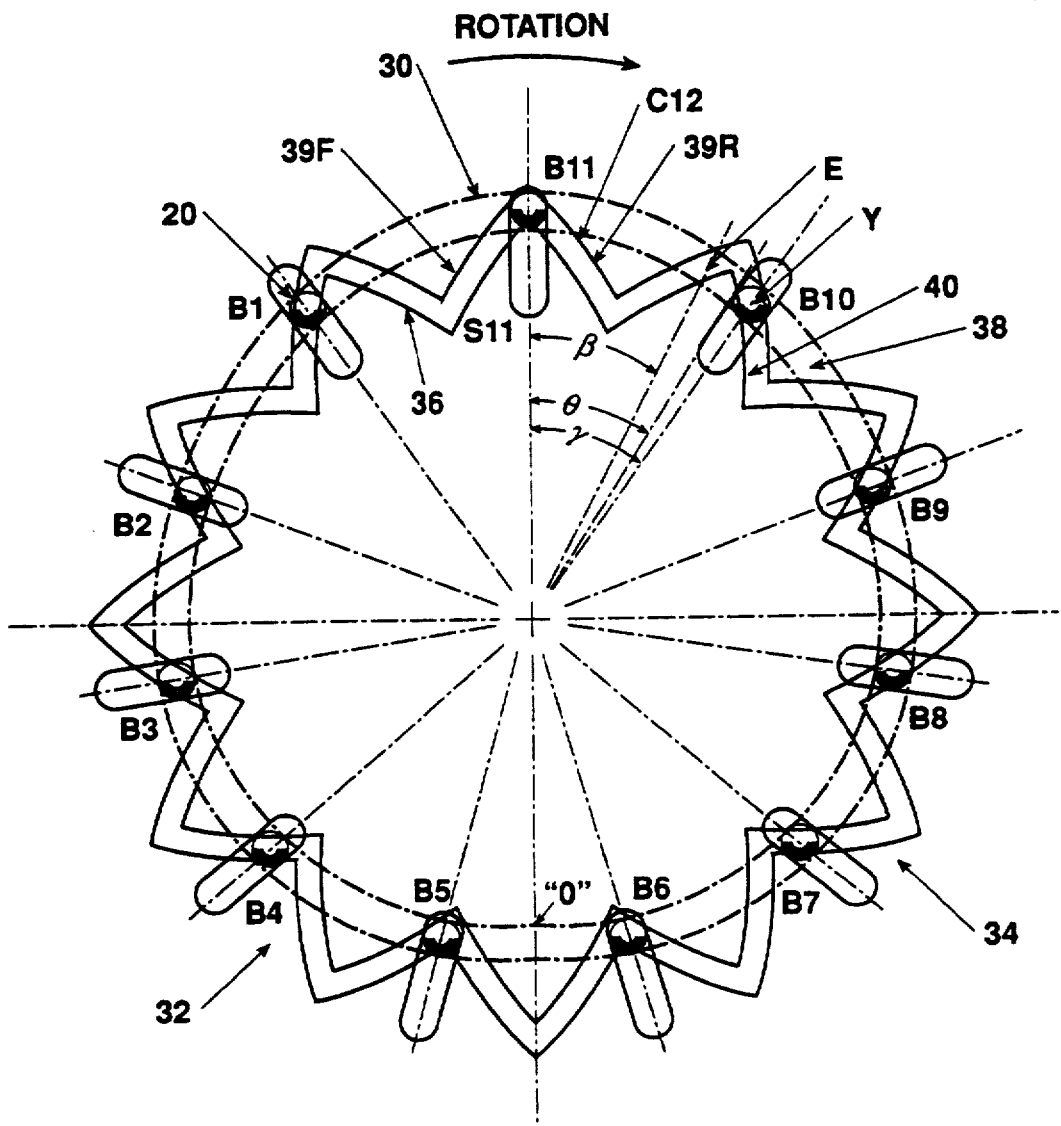
FIG. 5(b) is an overlay plan view of a single cycle drive cam, twelve cycle driven cam and balls and slots of the reaction disk according to an embodiment of the present invention.

In FIG. 5(b) cooperation of the cams shown at 0° index point of drive cam 30, C12 of driven cam 36 and slot S11 of reaction disk 20. These laws are satisfied by the overlaying the two cam tracks. In this embodiment, a 12 cycle cam having ball track 40 is overlayed over a one lobe drive cam having ball track 38. There are two points of intersection (Z, Y) at each of the 12 cycles of the driven cam ball track 40. The subtended angle of these two points yields one angle B less than 30° and the other, γ, greater. By selecting the greater, slots S1-S11 can be located Y degrees apart as in FIG. 5(a). Accordingly, up to 11 balls can be utilized in this cam set. If the drive cam had two lobes, the maximum number of balls would be 10.

The maximum number of balls and slots is equal to the number of cycles in the driven cam minus the number of lobes in the drive cam. Therefore γ is compiled as $$\gamma = \frac{360°}{\text{no. of cycles in driven cam} - \text{no. of lobes in drive cam}}.$$

In this embodiment, $$\gamma = \frac{360}{12 - 1} = 32.7272°.$$

The number of balls for a given speed reducer is a function of the number of cycles in the two cams and the resulting number of slots in the reaction disk design. Ideally, a ball in each slot would be optimal, however an assembly will work with a minimum of two balls in the slots provided they are at a discrete angle apart from each other. It is possible that two balls, at inappropriate angles, may be ineffective in transmitting the rotary motive force through the reducer if they are located at the maximum and minimum points, such as at B11 and B5 in FIG. 5(b). In such case, a third ball would be necessary to sustain smooth and continuous rotation of the output driven cam. The two balls at these points are in a transition state, and in that instant, they are essentially unable to transmit any effective torque. The two balls will become effective elements immediately beyond those maximum/minimum points, and therefore the third ball will be active during this period. It is obvious that a full complement of balls, established by the number of slots, is optimal and has significant impact on the capacity of the reducer as well as their effect in sustaining smooth, continuous, constant rotation with essentially zero backlash.

In the embodiment of FIG. 5(a), balls B1-B5 are inserted in slots S1-S5 and will react to the fall side 32 of drive cam 30 for a clockwise rotation of the drive cam. Balls B6-B10 are inserted in slots S6-S10 and will react to the rise side 34 of the drive cam, for the same rotation. Ball B11 is inserted on the apex of the 12the cycle C12 of the driven cam 36 and is in the maximum point transition from the rise mode to the fall mode. A minimum point transition will occur when the "0" point of the drive cam reacts with any of the cycles of the driven cam at which time the affected ball will go from the fall mode to the rise mode. These transitions occur at the "0" minimum point and the 180° maximum point, an example of which is shown in FIG. 5(a). The overlay of FIG. 5(a) is a snapshot of one instant in the 360° rotation of the drive cam.

The Ball Legend of Table 1 is a compendium of the ball action of the 12:1 speed reducer embodiment of FIG. 5(b) for 180° rotation (the other 180° of rotation being understood). As can be seen, before rotation starts, ball B11 is at a transition maximum point. The instant clockwise rotation of the drive cam starts, balls B1-B5 along with B11 are in a fall mode, while balls B6-B10 are in a rise mode. As the drive cam rotates, a transition minimum point occurs at 16.3636 degrees at B5. The fall mode of B5 has been completed and B5 will now start a rise mode. All other balls will continue in the same mode until the next transition point occurs. As can be seen, the transition points alternate as the drive cam rotates, at which time the affected balls change mode. At the maximum transition points, the ball will go from a rise mode to a fall mode while at the minimum transition points the ball will go from a fall mode to a rise mode. The balls meanwhile traverse radially in or out in the slots of the fixed reaction disk. At 180° rotation of the drive cam, ball B11, which was at a maximum transition point at 0° is now at a minimum transition point. Balls B1-B5 which were in a fall mode are now starting a rise mode while balls B6-B10 which started a rise mode at 0°, are now ready to start a fall mode at 180°. All the balls are now in position to reverse their action to accommodate the drive cam rotation from 180° to 360°. The final disposition of ball action at 360° (0°) will reflect the original ball orientation and mode. In the one clockwise revolution (360°)

of the drive cam, the driven cam will have rotated 30° in a clockwise direction (12:1 speed ratio).

The rise side 34 and the fall side 32 rotate with the drive cam and ultimately dictate the rise and fall action of the balls. The ball history described above is repeated exactly the same for each revolution of the drive cam. This Ball Legend will be reversed for a counterclockwise rotation of the drive cam.

more, appropriate design techniques can essentially balance these cams. These include having holes or slots, and if necessary, where possible, having a similar cam track on the opposite face that is 180° out of phase with the working cam track. Finally, since unbalance is most critical at high speeds, this may only be necessary for the drive cam input. Since the balls do not rotate, their masses do not materially affect the dynamic balance of

TABLE 1

| Drive Cam Rotation | Driven Cam Rotation | BALL LEGEND Rising Balls (number) | Falling Balls (number) | Transition Ball |
|---|---|---|---|---|
| 0 | | | | B11 (max. pt.) |
| 0–16.3636 | 0–1.3636 | B6–B10 (5) | B1–B5, B11 (6) | |
| 16.3636 | | | | B5 (min. pt.) |
| 16.3636–32.7272 | 1.3636–2.7272 | B5–B10 (6) | B1–B4, B11 (5) | |
| 32.7272 | | | | B10 (max. pt.) |
| 32.7272–49.0908 | 2.7272–4.0908 | B5–B9 (5) | B1–B4, B11, B10 (6) | |
| 49.0908 | | | | B4 (min. pt.) |
| 49.0908–65.4544 | 4.0908–5.4545 | B4–B9 (6) | B1–B3, B11, B10 (5) | |
| 65.4544 | | | | B9 (max. pt.) |
| 65.4544–81.8181 | 5.4545–6.8181 | B4–B8 (5) | B1–B3, B9–B11 (6) | |
| 81.8181 | | | | B3 (min. pt.) |
| 81.8181–98.1816 | 6.8181–8.1817 | B3–B8 (6) | B1, B2, B9–B11 (5) | |
| 98.1816 | | | | B8 (max. pt.) |
| 98.1816–114.5452 | 8.1817–9.5453 | B3–B7 (5) | B1, B2, B8–B11 (6) | |
| 114.5452 | | | | B2 (min. pt.) |
| 114.5452–130.9080 | 9.5453–10.9089 | B2–B7 (6) | B1, B8–B11 (5) | |
| 130.9080 | | | | B7 (max. pt.) |
| 130.9080–147.2724 | 10.9089–12.2725 | B2–B6 (5) | B1, B7–B11 (6) | |
| 147.2724 | | | | B1 (min. pt.) |
| 147.2724–163.6363 | 12.2725–13.6363 | B1–B6 (6) | B7–B11 (5) | |
| 163.6363 | | | | B6 (max. pt.) |
| 163.6363–180.0000 | 13.6363–15.000 | B1–B5 (5) | B6–B11 (6) | |
| 180.0000 | | | | B11 (min. pt.) |

The speed ratio (SR) of speed reducer assembly 10 is determined by comparing the inverse of the number of cycles (W) of the drive cam 30 to the number of cycles (Z) of the driven cam 36, expressed as follows:

$$SR = \frac{1}{W/Z}.$$

Therefore, in the arrangement of FIGS. 1–5, the speed ratio is 12:1.

Assembly 10 acts essentially like a bearing. It has extremely high torque capability since all the balls are sharing the loads essentially equally; it has very smooth torque transmission which is constant, without speed or angular variations throughout 360 degrees of rotation of the output; and it is free of vibrations since the ball placement and all components are symmetrical in design and dynamically balanced, rotating concentrically about their common axis of rotation. Ideally, perfect symmetry is achieved when even numbers of cycles are used on the cams. In these cams, masses are perfectly matched 180° apart for the complete 360° of the cam. In the 12:1 reducer, the driven cam with 12 cycles is perfectly balanced since any area on the cam surface will be balanced with an identical area 180° from it.

The one cycle drive cam is asymmetrical about the horizontal centerline and therefore not "perfectly" balanced. The unbalance in these cases is of such an insignificant amount that they will appear as a second or third harmonic and will be frequency dependent. These cams are generated in perfect symmetrical disks with cam tracks that are constant in depth, so masses are equal 180° apart. The only variation is the difference in the location of the mass centers 180° part. Since such a small Percentage of the cross-section of the disk is removed when machining the track, the change in location of the mass centers will be very small. Furtherthe rotating members.

FIGS. 1–5 illustrate a speed reducer apparatus with a drive cam with a single lobe, but a greater number of drive cam lobes is also within the scope of the invention. For example, a four lobe cam combined with the twelve lobe driven cam 36 optimally would have 8 balls (12 cycles minus 4 cycles), and would have a speed ratio of 3:1 (4 cycles drive/12 cycles driven). Hence, it can be seen that by varying the number of cycles on either cams, many combinations of speed ratios are possible. As well, speed increases may be made accordingly.

Figure 6A:
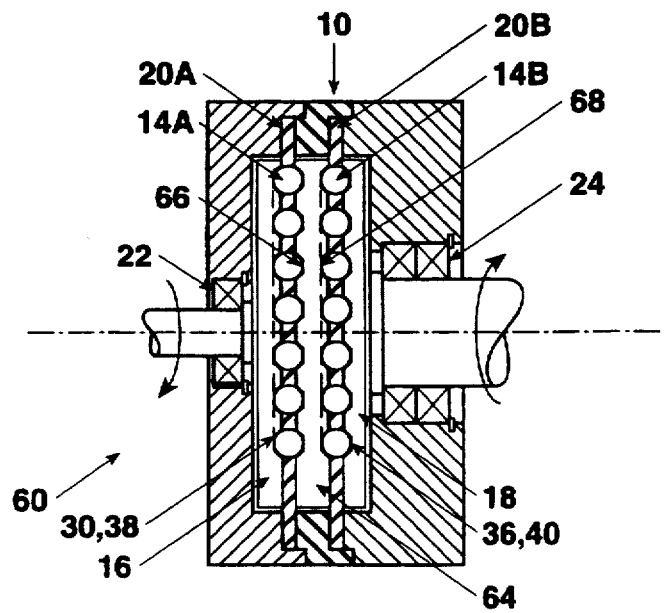
FIG. 6(a) is a partial side sectional view of a multi-stage embodiment of the present invention. multi-stage
Figure 6B:
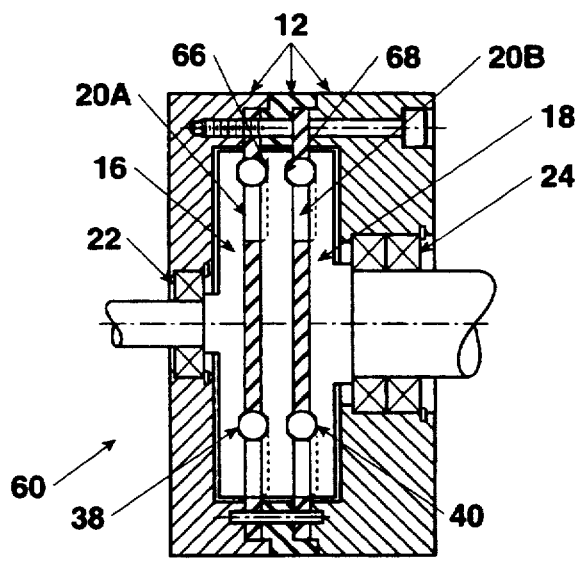
FIG. 6(b) is a side view of the FIG. 6(c) is a side view of multi-stage embodiment of FIG. 6(a) showing preload feature.
Figure 6C:
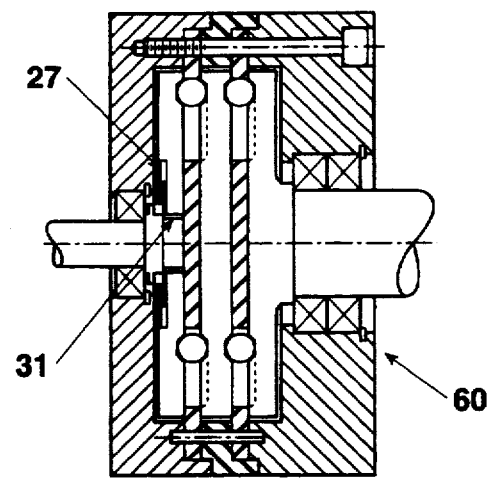

In an alternative embodiment of the invention, very high speed ratios are obtained by utilizing various numbers of interim cams. This is demonstrated in the illustration of speed reducer assembly 60 in the side view of FIG. 6(a) and the partial cross-section of FIGS. 6(b) and 6(c). Essentially, assembly 60 is a combination of two of the single stage speed reducer assembly of FIG. 1. More particularly, speed reducer assembly 60 includes drive member 16, an interim member 64 and driven member 18. Drive member 16 and driven member 18 may be configured as described earlier, including having a respective drive cam 30 with ball track 38 and driven cam 36 with ball track 40. A first face of interim member 64 is provided with a driven cam 66, configured as desired and perhaps such as like cam 36. A second face of interim member 64 is Provided with a drive cam 68, configured as desired and perhaps such as like cam 30. This creates a two stage combination of a first paired drive cam and driven cam (first stage) and a second paired drive cam and driven cam (second stage), with balls 14A, 14B and reaction disk 20A, 20B, respectively, interposed between each stage. Hence, each interim cam provides an additional stage of reduction.

The speed reduction (SR) ratio is determined as the inverse of the product of the ratio of the number of cycles (W) on the drive cam compared to the number of cycles (X) on the first face of the interim cam times the ratio of the number of cycles (Y) on the second face of the interim cam compared to the number of cycles (Z) on the driven cam, expressed as follows:

$$SR = \frac{1}{W/X \times Y/Z}.$$

Figure 2:
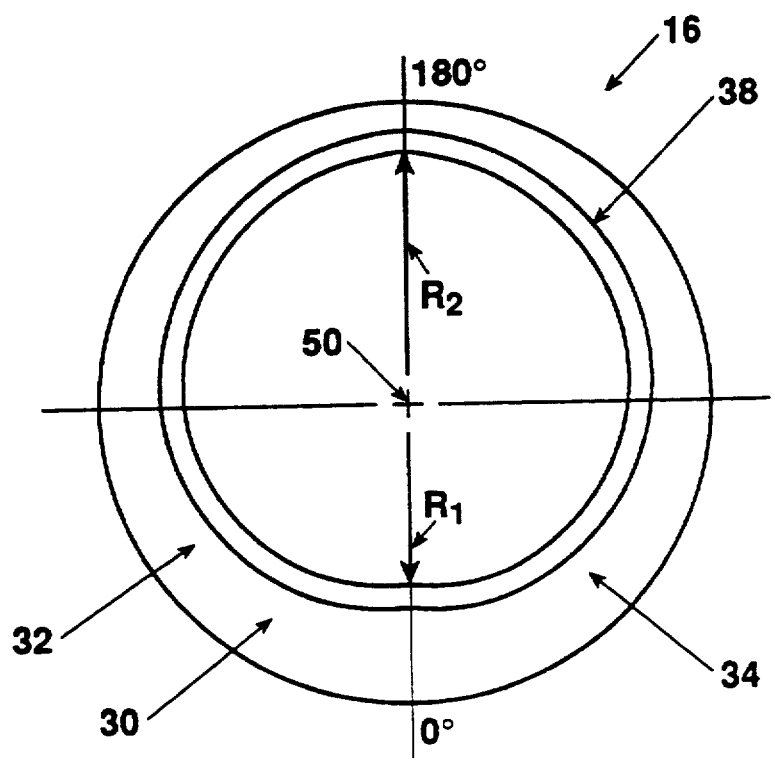
FIG. 2 is a plan view of a single cycle drive member face cam according to an embodiment of the present invention.

For example, utilizing 12 cycles on the first interim face cam and one cycle on the second interim face cam in combination with the 1/12 speed reducer of FIGS. 1 and 2, yields the assembly shown in FIGS. 6(a,b,c), having a speed reduction ratio of $$SR = \frac{1}{1/12} \times \frac{1}{1/12} = \frac{1}{1/144} = 144$$

It is therefore possible to achieve an almost unlimited range of speed reduction in practice of the present invention. For example, with two interim cams with 1:30 speed ratios at each interface, the following speed reduction is possible:

$$SR = \frac{1}{1/30} \times \frac{1}{1/30} \times \frac{1}{1/30} = \frac{1}{1/27,000.} = 27,000$$

Volumetric efficiency is optimized in the present invention, such that substantial cost effectiveness is possible. This is particularly true when considered in the light of the load sharing aspects of the balls.

Speed reducers using gears transmit torque essentially one gear tooth at a time. Consequently, the only accommodation for gears that can be made to have high torque loads is to increase tooth proportions so that contact stresses are within allowable limits for wear and fatigue life. The speed reducer of this invention utilizes a plurality of balls to transmit the load. The immediate benefit is to distribute the forces essentially equally around 360° of the cams and to highly localized forces and unbalanced loads as is present in gear reducers. For the same magnitude of torque of a gear reducer, the speed reducer of this invention, utilizing a plurality of balls, sharing the load among the balls, results in considerably reduced contact stresses and realizes less wear and longer life. At the same time, use of smaller components in smaller housings for the same transmission of torque is possible. The foregoing also applies to epicyclic drives using eccentric motion devices where perhaps two lobes or teeth may be sharing the load. In such cases, in order to avoid higher than acceptable contact stresses larger components are required.

A further advantage of the invention is the action that transpires during the transmission of torque. Such action is essentially rolling action similar to a ball bearing, whereas there is considerable sliding action in gears and a combination of sliding and rolling action in epicyclic reducers. Sliding is abrasive in nature, and induces surface shear stresses that can accelerate wear life of the components involved. In summary, the speed reducer of this invention offers a smaller operating unit with extreme smoothness and less wear for longer life and better efficiency.

The multi-ball capability of this invention is possible due to the interaction, through the balls, of the two cam configurations that result in a precise, predictable reaction of the balls at each of their locations. The cams must be designed to control the ball displacements in a way that is in concert with the angular velocity of the two cams at any instant of time. Furthermore, these ball displacements will follow radial lines that are equal in length to the cam displacement "D" shown in FIG. 7(a), and essentially describes the slot parameters in the reaction disk. These radial lines are indeed the loci of the ball centers for the entire engagement of the two cams in both the rise mode, radially out, and the fall mode, radially in.

The ball reactions are independent of each other, as each ball is free to oscillate in its own slot at velocities dictated by the conjugate action of the cams at any instant of time. It is this feature that makes it possible to design many combinations of cams capable of successfully performing in this invention. The cam configurations of the above 12:1 embodiment form a unique pair in that the balls will traverse their slots at essentially the same constant linear velocity. Other conjugate cam pairs will result in balls translating in their slots at variable linear velocities, which is acceptable since the conjugate cam configurations would accommodate the variable velocities at each ball position at any instant of time. In any of the cam pairs above, an equal angular displacement will occur at each ball location for the driven cam which is proportional to the speed reduction and the input angle of the drive cam. Further, the angular velocity of the driven cam will be constant throughout the 360° rotation of the drive cam. These results will be discussed below.

The interaction of these cams and their resultant performance is defined as two cams conjugate with each other in that the drive and driven cams when working together and reacting with the balls perform a specific function to achieve a predictable result. In this embodiment of the invention, the specific function is the equal linear velocity of all the balls for a given angular speed of the drive cam and the predictable result is an equal angular displacement and velocity of the driven cam at each ball location that is proportional to the speed reduction. These conjugate cams are interchangeable providing the ball velocity functions are the same. For the cam pair of FIG. 7(a) and 7(b), the ball linear velocity is constant and could be replaced, for example, by a two lobe cam whose two rise and fall cycles will interact with the twelve cycle driven cam and produce a constant linear velocity of each ball that is increased by a factor of two. In this case the two lobe drive cam is conjugate with the twelve cycle driven cam and results in a speed reduction of 6:1 (12/2).

The result of these conjugate cams is that acceleration, deceleration and constant speed of the input drive shaft coupled to the drive cam is faithfully reproduced at the appropriate speed reduction by the driven cam which in turn is coupled to the output shaft.

Figure 7A:
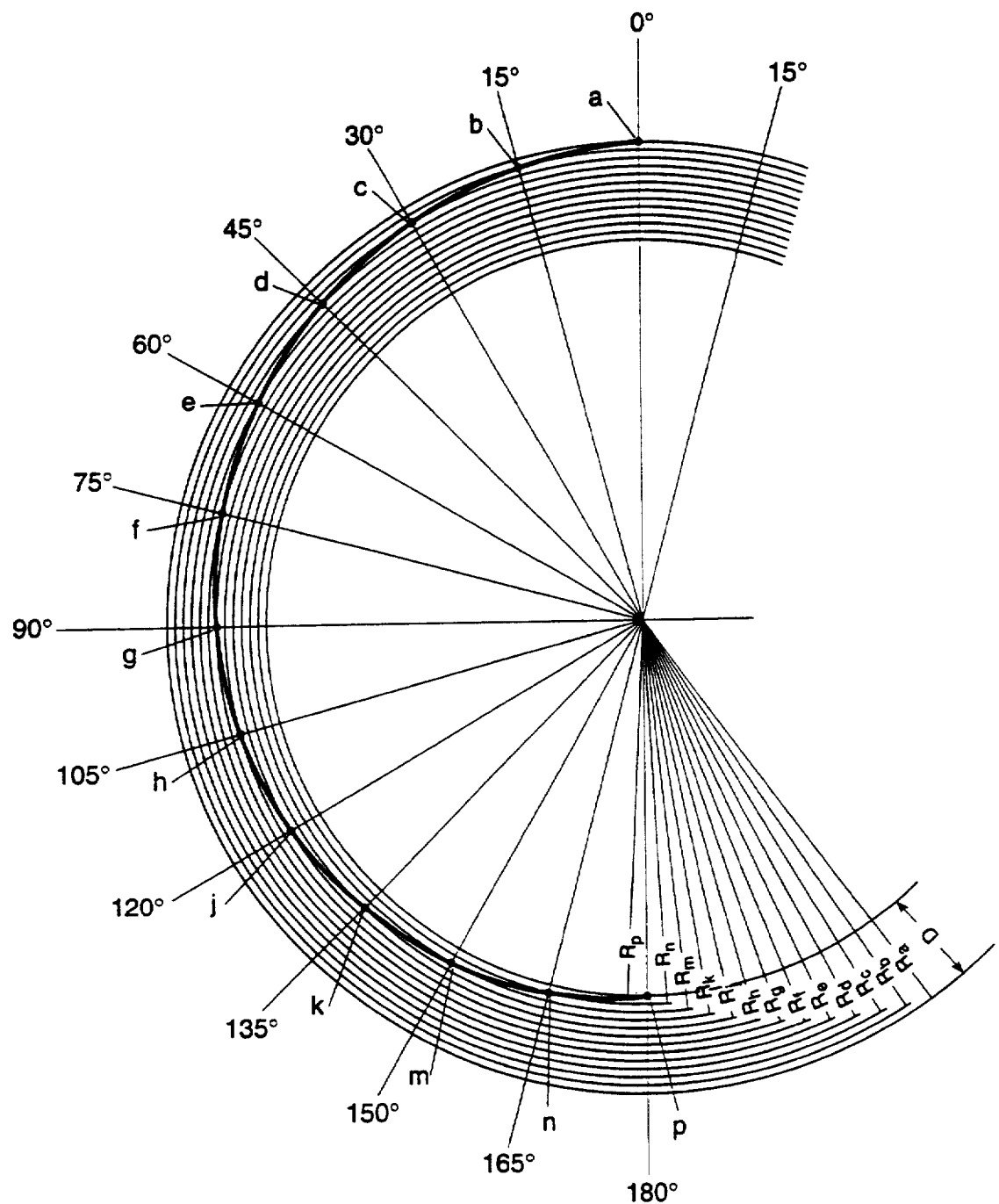
FIG. 7(a-f) are graphical representations of the interaction of the single stage drive member and the twelve stage driven member of FIGS. 1-5.

FIGS. 7(a) and 7(b) show the conjugate cams of the 12:1 embodiment previously described and illustrated in FIG. 3(a) and 3(b). FIG. 7(a) graphically develops the single lobe drive cam, 38, FIG. 3(a), and FIG. 7(b) graphically develops the 12th cycle of the driven cam 36, FIG. 3(b). Trigonometric expressions can be used to develop these curve but the graphical presentation illustrates the conjugate action most exactly and at the same time offers a pictorial overview of the mechanism.

In FIG. 7(a), the fall cycle, 32, of the drive cam is developed for clockwise rotation, and is based on the rise/fall displacement D and the maximum and minimum radii $R_a$ and $R_p$ respectively. The 180° fall angle is divided into 12 equal angles of 15°, and the rise/fall displacement D is divided into 12 radii of equal incremental increase from $R_a$ to $R_p$. The intersection of these elements shown as points a through p describe the centerline of the fall side of drive cam track, 32. This graphical development could have been accomplished with any number of equal elements of radii and angles, and indeed the more elements involved, the more accurate the curve can be delineated. This fall side of cam track 32 is capable of displacing any number of balls in it an equal increment radially inward, in their slots, for a given angular rotation of the drive cam 16. For this embodiment, a 15° rotation of the drive cam 16, 1/12th the fall angle of 180°, each of the balls in the cam track and their slots will be displaced 1/12th of the rise/fall displacement D. For the rise side 180°—360°, 34, FIG. 3(a), which is not shown in FIG. 7(a), the curve is a mirror image of 32, FIG. 7(a), and any balls in its cam track and in their slot, will be radially displaced outward 1/12th of the rise/fall displacement D for the same 15° rotation of the drive cam 16. Accordingly, all balls either on the rise or fall cycle of the cam track, 38, and in their slots will be radially displaced inward or outward an equal increment of the rise/fall displacement D, for a given angular rotation of the drive cam, 16.

FIG. 7(b) illustrates the graphical development of cycle C12 of the 12 cycle driven cam 18, FIG. 3(b). For a 12-cycle cam, a subtended angle of 30° (360/12) will be the angle travelled by the driven cam 18, FIG. 7(b). The C12 cycle is divided into two 15° sectors to accommodate the rise and fall cycle of the drive cam during its 360° rotation. Therefore, the C12 cycle shown for a clockwise rotation has a rise segment 39R and fall segment 39F and are shown as the rise side and fall side, FIG. 7(b). The two 15° angles are divided into 12 equal angles of 1.25° each. The intersections of these angles with the twelve radii $R_a$ to $R_p$ are noted as points a through $p_2$ on the fall side and a through $p_1$ on the rise side. The curve connecting these points, 36, forms the centerline of the cam track 36, for the C12 cycle. The remaining 11 cycles of the driven cam 18 are developed in the same manner so that each of the 12 cycles have identical fall/rise segments and the fall segment of one cycle is contiguous with the rise segment of its neighboring cycle which in turn is contiguous with the fall segment of its own cycle. This fall/rise cycling continuity is sustained for the remaining cycles to complete the 12 cycle driven cam configuration.

Hence, each fall/rise cycle of the driven cam is capable of reacting to one complete revolution of the single lob drive cam of FIG. 7(a) since it has a single fall/rise cycle for one revolution. This results in a rotation of 30° of the driven cam for 360° rotation of the drive cam. If the drive cam, 16, FIG. 7(a), were a two lobe design, then for one revolution of the drive cam, two fall/rise cycles of the drive cam will interact with the 12 fall/rise cycles of the driven cam and result in a rotation of two cycles, 60°, of the driven cam and in a 6:1 speed ratio. The fall/rise relationship of the 12 cycles is established by the direction of rotation of the drive cam, and as shown in FIG. 7(b), a clockwise rotation is assumed. The relationship would reverse for a counter-clockwise rotation of the drive cam.

Figure 7C:
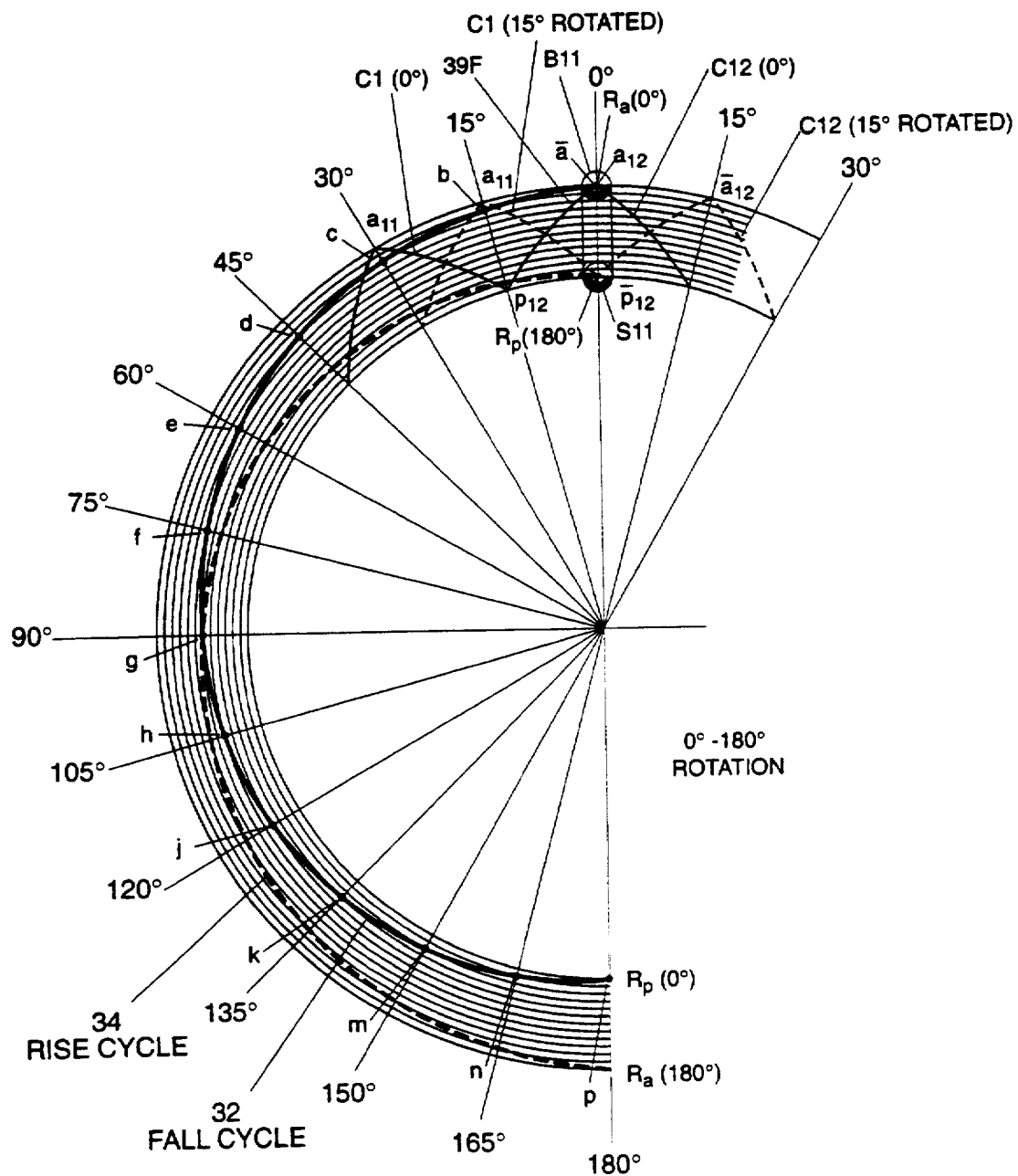
Figure 7D:
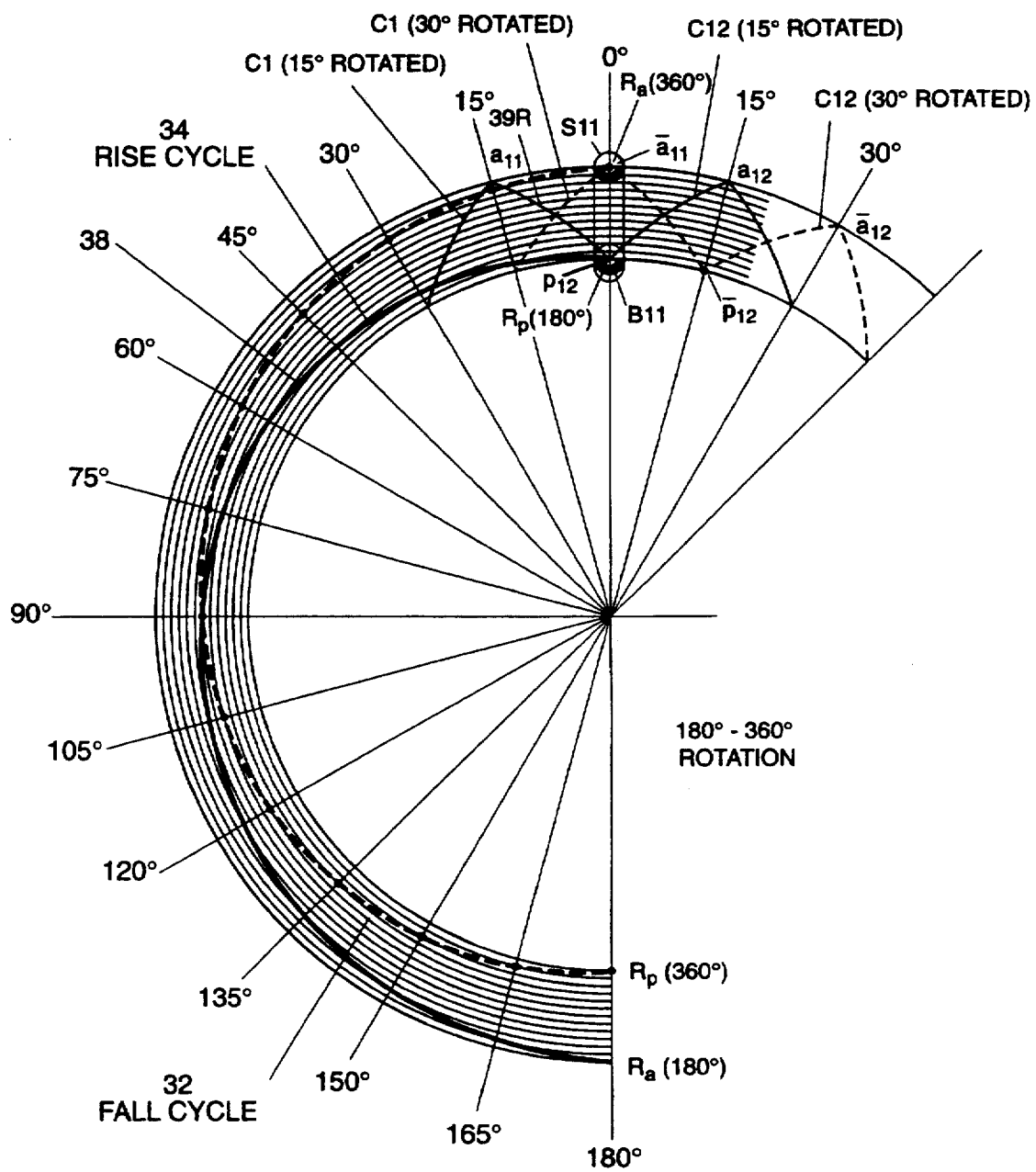

FIG. 7(c) and 7(d) are overlays of the two cams as developed in FIGS. 7(a) and 7(b) and illustrate the juxtaposition of ball B11 in slot S11 of the reaction disk at the moment of maximum transition of the C12 cycle and point "a" of the maximum radius Ra of the drive cam, FIG. 7(a). The rise mode of the two cams has been completed and the fall mode, 39F of cycle C12 and 32 of drive cam 38, is set to engage. FIG. 7(c) describes rotation from 0° to 180° of the drive cam and 0° to 15° of the driven cam. FIG. 7(d) continues from 180° to 360° and 15° to 30° respectively. For clarity, only the centerlines of the cam track are shown. Also, only 180° of the assembly are shown in each figure.

In FIG. 7(c), for a clockwise rotation of the drive cam 38, ball B11, which is in direct contact with both cams, will transmit a force from the drive cam 32 to the driven cam 39F and rotate the driven cam also clockwise. (A force analysis is shown in FIG. 8). The interaction of the conjugate cams will displace the ball radially inward, since both cams are in their fall modes. The radial inward travel is along the line a–$p_{12}$: from the maximum transition point, a, toward the minimum transition point $p_{12}$. The ball translation will be at a constant linear velocity, $V_{B11}$. As the drive cam continues through the 180° of rotation the ball at constant speed continues and arrives at $p_{12}$ which is the minimum transition point shown as p on radius $R_p$ of FIG. 7(a). The C12 cycle has rotated 15° and shown dotted while the ball, B11, centerline is coincident with $p_{12}$. The rise cycle 39R of C1 and the rise cycle 34 of cam 38 are shown dotted and rotated from the C1(0°) position. Balls B1 thru B5, FIG. 5(a), will all have started engaged in the fall mode and reacted as outlined in the Ball Legend. Balls B6 through B10 will have started engaged in the rise mode and reacted as outlined in the Ball Legend.

The juxtaposition described at the 180° rotation above is the initial condition for the 180° to 360° rotation FIG. 7(d). The B11 ball, at the minimum transition point $p_{12}$ is displaced radially outward by the rise cycle 34 of the drive cam. Here again, the interaction of the conjugate cams will translate the ball radially along $p_{12}$-a, to point a, at a constant velocity, $V_{B11}$, until the drive cam has completed the 180° to 360° rotation. The final positions of the C12 cycle, C1 cycle, ball B11 and drive cam 38 are shown dotted in their final positions. The drive cam 38 has completed one revolution and is in its original position, cycle C12 has rotated 30° (360/12), and cycle C1 occupies the exact position of C12 at the 0° position. The elements are all in their correct juxtaposition to initiate the next revolution of the drive cam.

In the case of a two lobe drive cam, the interaction described above of course will occur twice for one revolution of the drive cam. The B11 ball velocity will be $2V_{B11}$ since two cycles will be required for one revolution. The 12 cycle driven cam will have rotated 60°. The ball velocity at all locations will be $2V_{B11}$ and translating back and forth in the slots for two cycles. The constant velocity of the driven cam is graphically demonstrated in FIGS. 7(e) and 7(f).

Figure 7E:
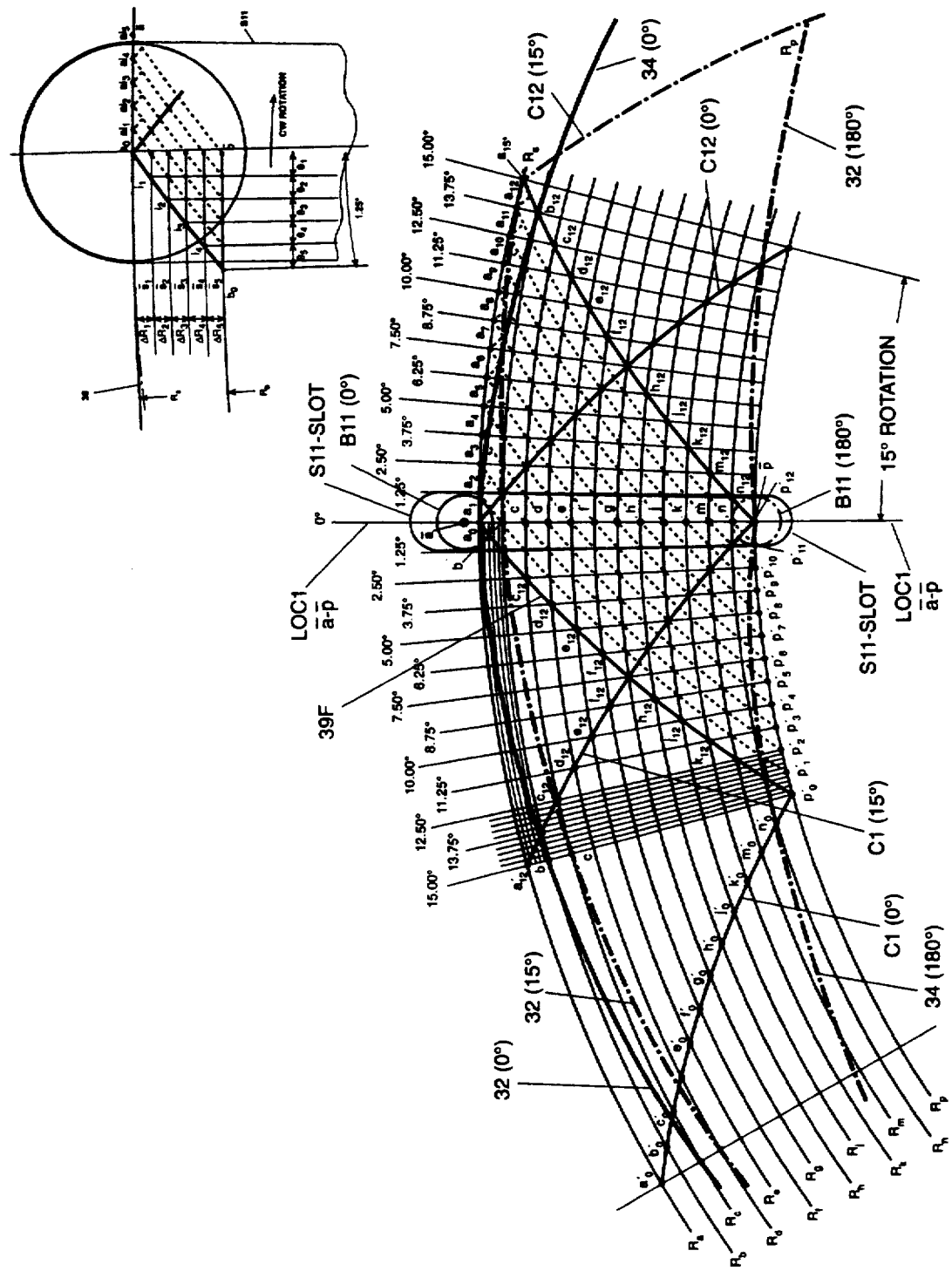

FIG. 7(e) is an enlarged view of the elements as they are aligned at the 0° index of FIG. 7(c). The two cams are overlayed and divided as in FIG. 7(a) and 7(b). The fall side of C12 represented by points $a_o$ through $p'_o$ is set to engage the fall side of cam 38(0°), partially shown as points a, b, c on radii $R_a$, $R_b$ and $R_c$ and also in FIG. 7(a). The slot S11 of the reaction disk has its radial centerline at the 0° index and is shown as loci a–p. Since the reaction disk does not rotate the slot is fixed in this position.

For clockwise rotation of the drive cam, the cam track 38, as developed in FIG. 7(a), will displace the ball radially inward at a constant rate within the slot S11. The rate is 1/12 the displacement D per 15°. The ball in turn is engaging the fall side 39F of cycle C12 from $a_0$ to $b_0$, (see enlarged inset, FIG. 7(e)), and in the process creates a reactive force in the drive cam that creates a moment about the center of rotation. This force will be discussed in FIG. 8. Rotation continues to where the drive cam 38 has displaced the ball B11 to point $\bar{b}$ along the loci $\bar{a}$-$\bar{p}$, at which time Point $b_0$ of cycle C12 and point b of drive cam 38 will also have arrived. The interaction of the ball B11 and fall side 39F of cycle C12 occurs along $a_0$-$b_0$ (see inset FIG. 7(e)). The portion $\bar{a}$-$\bar{b}$ of the loci $\bar{a}$-$\bar{p}$, is the path of action on which the centerlines of the two cam tracks and the center of the ball are coincident during their interaction for 15° rotation of the drive cam. The driven cam will have rotated 1.25° (15°/12), and is shown dotted in position $a_1$-$p'_1$.

The angular displacement is constant and is illustrated further in the inset FIG. 7(e). Points $a_0$ and $b_0$ were developed in FIG. 7(b) and in like manner interim point $i_i$ to $i_5$ are developed in the inset. Equal incremental radii changes are plotted with an equal number of incremental angles $\theta_1$ through $\theta_5$ for the subtended angle of $b_0$, 1.25°. Their intersection results in the incremental points $i_1$ through $i_5$, which indeed are incremental points between $a_0$-$b_0$ of C12. Also shown are arc segments $S_1$ through $S_5$ which are the arc length interim points $i_1$ through $i_5$ travel for the incremental angle $\theta_1$ through $\theta_5$. Therefore, for an incremental displacement, say, $a_i$ to $i_1$, each incremental point $i_i$ through $i_5$ would travel their incremental arc length S1 through S5, which is the incremental angle $\theta_1$ and shows (dotted), the new rotated position $a_i$. This relationship continues for the remaining incremental displacements through $a_{i5}$-$i_5$ at which time $b_0$ would have arrived at $\bar{b}$ along with b of radius $R_b$ in cam track 38 and the centerline of the ball. It can be seen that by summing up all the infinitesimal increments from $a_0$ to $b_0$ with their corresponding infinitesimal incremental angles in $\theta$, all the engagements would occur on the loci and would reflect a constant angular rotation of the driven cam as a function of the angular rotation of the drive cam. The five dotted positions $a_{i1}$ to $a_{i5}$ illustrates the equal angular positions of C12.

As the drive cam continues its rotation, the ball B11 continues its inward radial travel along the loci $\bar{a}$-$\bar{p}$ and continues it interaction with the fall cycle 39F of cycle C12. FIG. 7(e) illustrates the sequence of rotation of cycle C12, dotted, as the ball reaches the twelve loci points $\bar{a}$ to $\bar{p}$. The constant angular displacement of 1.25° can be seen for the equal incremental displacements between the loci points $\bar{a}$ through $\bar{p}$. For a 180° rotation of the drive cam all elements are aligned at $\bar{p}$ and the driven cam C12 will have rotated 15° as shown, C12 (15°), in accordance with the speed ratio of 12:1.

Figure 7F:
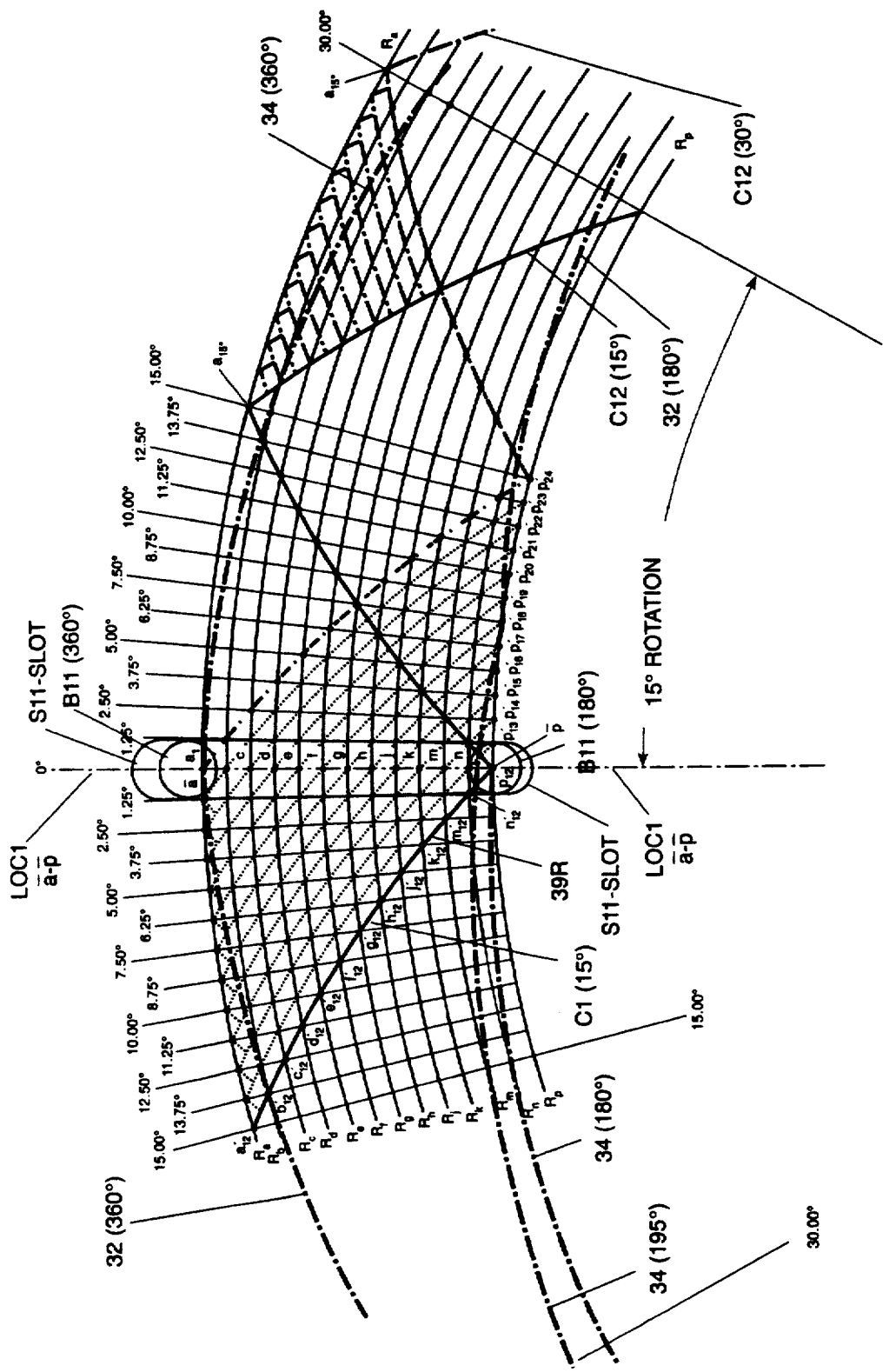

FIG. 7(f) continues the rotation for 180° to 360°. Here, the rise mode 34 (180°) of the drive cam 38 is in contact with the rise mode of cycle C1 (15°) and the ball B11 (180°) is at the innermost travel in slot S11. This juxtaposition is exactly the same position of elements at the completion of 180° rotation in FIG. 7(e). As the drive cam continues its clockwise rotation the rise cycle 34, FIG. 7(d), will displace the ball B11 radially outward along the loci $\bar{p}$-$\bar{a}$ in slot S11 and interact with the rise cycle 39R of cycle C1 (15°). The conjugate cam tracks will repeat the same interaction developed in the fall cycle of FIG. 7(e) an continues to rotate the driven cam clockwise at a constant angular rotation proportional (12:1) to the drive cam rotation. The sequence of rotation, dotted $a_{12}$ to $a_{24}$, shows the constant 1.25° rotation of C12 from 15° to 30°. When the ball B11 (360°) arrives at $\bar{a}$ the drive cam 38 (360°) would have completed one revolution and the driven cam C12 (30°), 30°. The centerlines of the two cam tracks and ball B11 are all coincident at $\bar{a}$ at this time and the juxtaposition of elements is ready to repeat the next rotation cycle. Accordingly, as the drive cam rotates each revolution the interaction of FIGS. 7(e) and 7(f) will be repeated.

The action described for the ball B11 occurs in synchronization at each of the eleven ball Positions. The only difference is that they are either leading or lagging the balls at maximum and minimum transition. FIG. 5(b) is a snapshot of the balls and shows them at points of the cycle. Balls B1 to B5 are lagging the maximum transition ball B11 and ball B6 is leading balls B7 to B10 toward the minimum transition point. FIGS. 7(e) and 7(f) demonstrate the conjugate cams of this embodiment in which the drive cam displaces all the balls along their loci, radially in or out, an equal amount for a given angle of rotation producing the same linear velocity of the balls and rotating the driven cam an equal angle at all ball positions that is proportional to the speed reduction. For other conjugate cam sets the drive cam action will displace balls unequally but the conjugate action of the two cams will result in rotating the driven cam the same angle at each ball location.

Figure 8A:
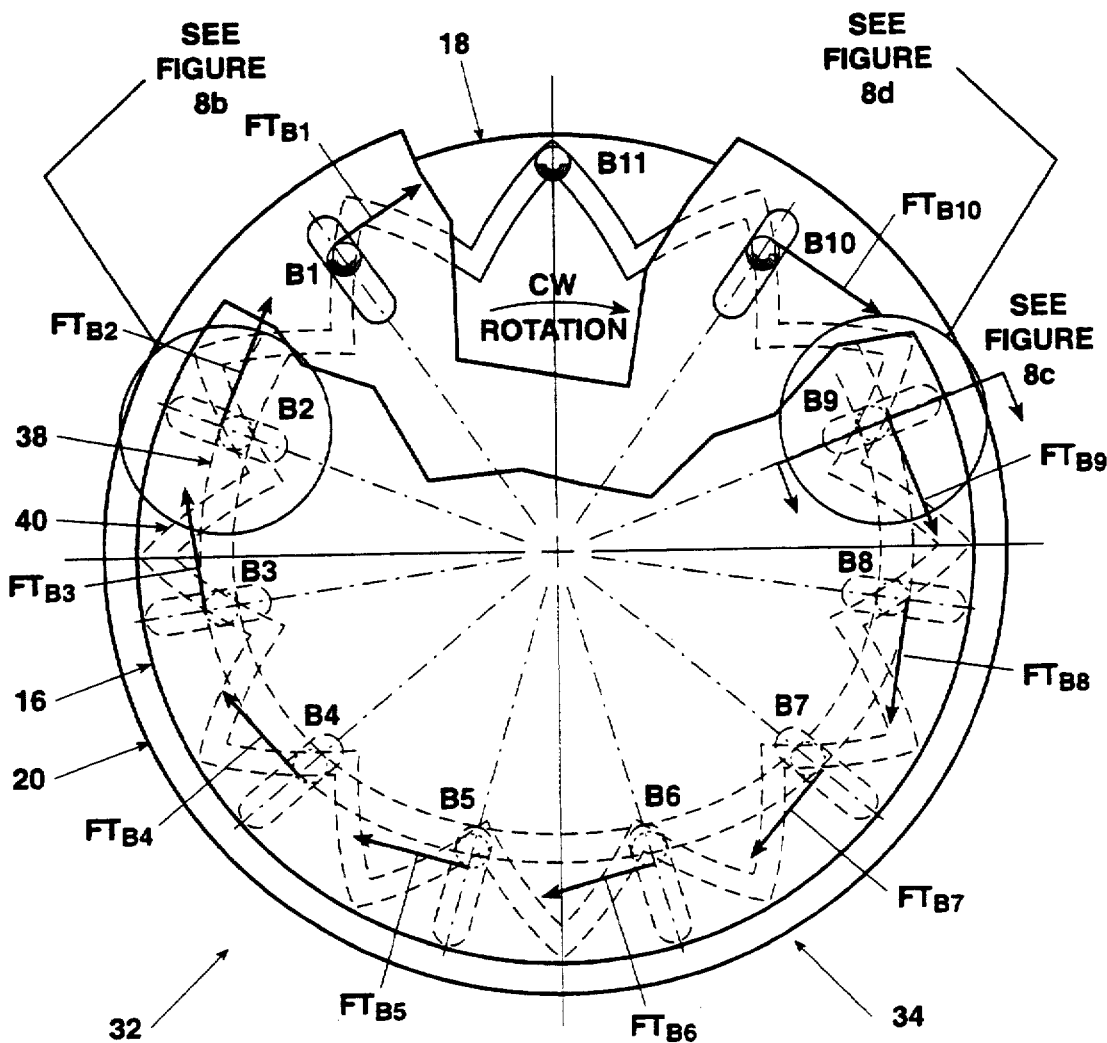
FIG. 8(a) is a superposition of the cam tracks of the drive member and driven member according to FIG. 7(a-e) interacted by a ball, with the drive cam falling.
Figure 8B:
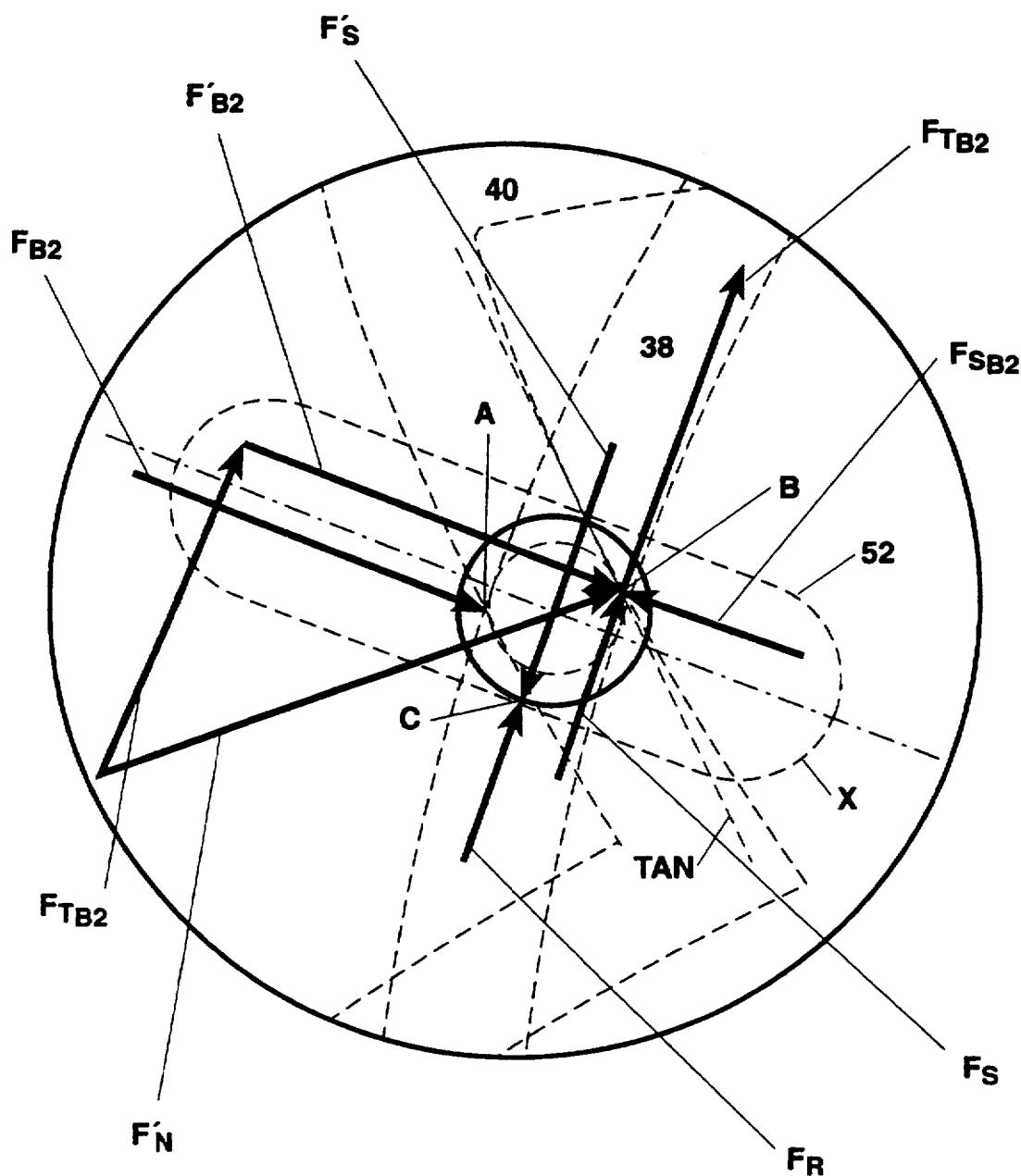
FIG. 8(b) is an enlarged inset of force diagram at ball B2 position of FIG. 8(a).
Figure 8C:
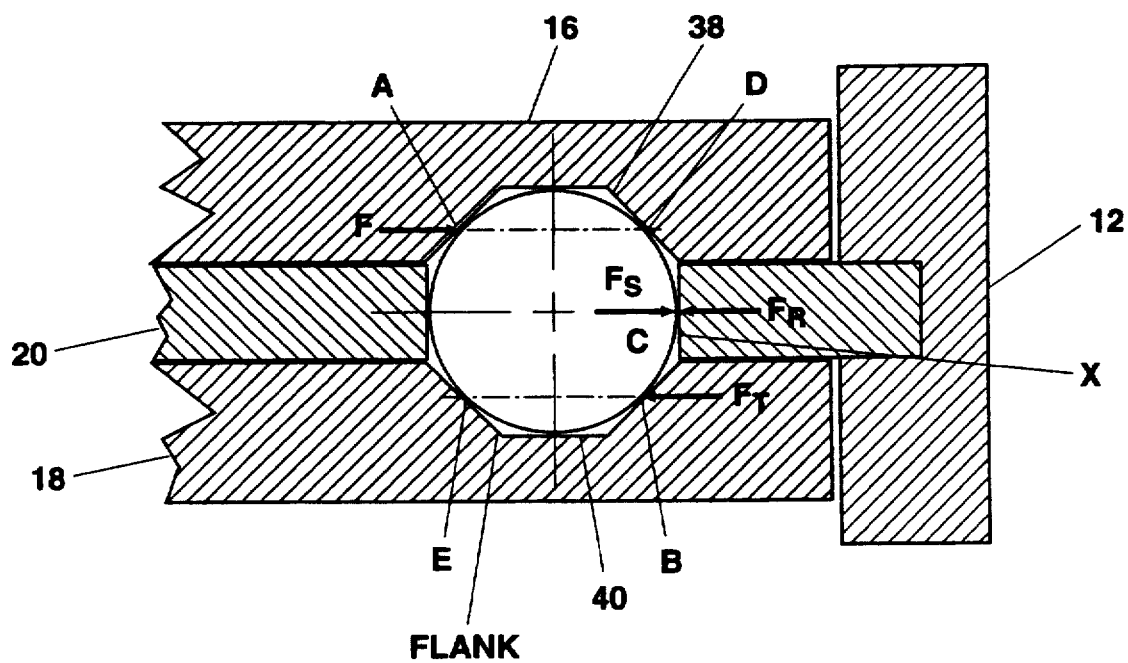
FIG. 8(c) is a section through the cams, reaction disk and balls to show force contact planes of FIG. 8(a).
Figure 8D:
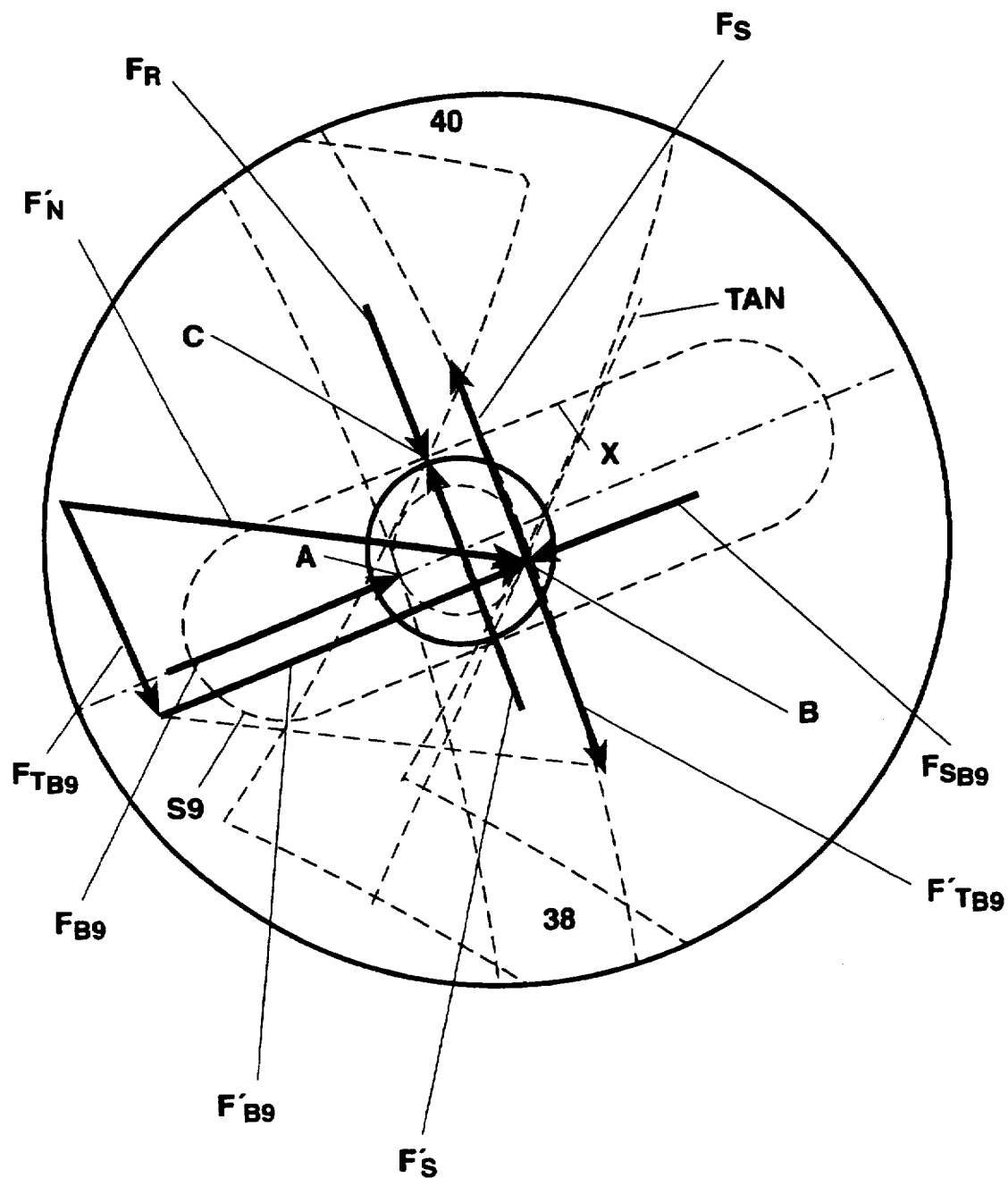
FIG. 8(d) is an enlarged inset of force diagram at ball B9 piston of FIG. 8(a).

FIG. 8(a) shows the interaction and forces that occur from the cooperation of the cam ball tracks 38 and 40, the balls, and the reaction disk during the transmission of the rotary motive force from the drive cam 16 to the driven cam 18. The eleven ball positions of this embodiment (12:1) are shown with inset FIG. 8(b) illustrating the action for the fall side mode 32 and inset FIG. 8(d) illustrating the action for the rise side mode 34 of the drive cam. Sectional view FIG. 8(c) shows the ball, reaction disk slot S2 and the two cams 16 and 18. Also shown are the contact planes D and E in each cam, with ball contact points A and B, along with C, the ball contact point in one of the slots of the reaction disk.

For a clockwise rotation of the drive cam 16, at ball position B2, the fall cycle 32 of cam track 38 will establish a force F shown as $F_{B2}$ in magnitude and direction. This force is applied to the ball at contact point A, FIGS. 8(b,c), in the contact plane D. In turn, the force $F_{B2}$ is transmitted to the driven cam 18 by the ball at point B and is shown as $F'_{B2}$ in magnitude and direction and is essentially equal to $F_{B2}$. There is an equal and opposite force $F_{SB2}$ established in the driven cam that reacts $F_{B2}$. These contact points establish the rolling action of the ball. As the drive cam rotates, the conjugate action of the two cams will start the ball rolling inward along a radial straight line. However there is a separation force $F_S$ equal and opposite to the tangential force $F_{TB2}$ that must be accommodated in order that the ball maintain contact with cam track 40 at point B and transmit the tangential force $F_{TB2}$. The magnitude of $F_{TB2}$ is determined vectorially by the normal force $F'_N$ which is perpendicular to the tangent, TAN, FIG. 8(b), of the cam track 40 at point B. The vector can now be drawn perpendicular to the force $F'_{B2}$ until it intersects the normal $F'_N$. The separation force $F_S$ is equal and opposite to this force $F_{TB2}$, and is reacted by the reaction disk 20 at point C, FIGS. 8(b,c), and on the X flank of slot S2. FIG. 8(c) shows the slot rotated from its true position only for explaining the action at point C, since the force $F_S$ is perpendicular to the plane of the paper. The force $F_S$, FIG. 8(b,c) is reacted by $F_R$ which is internal to the reaction disk 20. Since the reaction disk 20 is pinned, and therefore fixed to the housing 20, the separation force $F_S$ will be reacted and the ball will maintain contact with the driven cam 18 throughout the conjugate action of the cams. Accordingly, the tangential force $F_{TB2}$ will transmit the rotary motive force to the driven cam 18 at point B of cam track 40. The conjugate action of the two cams will allow the ball to roll radially inward in a straight line that is parallel to the radial slot of the reaction disk. The angular displacement of the driven cam 18 will proceed in accordance with the speed ratio established by the conjugate cams, which in this embodiment is 12:1, and in the same clockwise rotation of drive cam 16.

For the clockwise rotation of the drive cam, and at the ball position B9, inset FIG. 8(d), the rise cycle 34 of ball track 38 will establish a force F shown as $F_{B9}$ in magnitude and direction at point A. The ball tracks 38 and 40, and ball B9, cooperate in the same manner as in the case of B2, except the force $F'_{B9}$, outward and contacts the opposite flank of ball track 40 at point B. As shown, resultant tangential force $F_{TB9}$ will be established in the same manner as $F_{TB2}$, and will transmit the rotary motive force to the driven cam at point B. This tangential force $F_{TB9}$ will also apply a clockwise rotation to the driven cam 40 and essentially at the same magnitude as the tangential force at B2. These forces will not change appreciably in magnitude during the rise or fall mode since the tangent angle for the normal force will not change significantly. This can be seen in FIG. 7 for the 10 positions of the driven cam at the a–$p_{10}$ loci of points. The tangent drawn at each of these points results in TAN angles that are essentially equal.

FIG. 8(a) illustrates the ten tangential forces $F_{TB1}$ to $F_{TB10}$ that are sharing in the torque that is being transmitted from the drive cam 16 to the driven cam 18. Ball B11 which at this moment is in transition, will participate in load sharing shortly as it comes under the influence of the fall mode 32 of the drive cam track 38. In summing up the horizontal and vertical components of these tangential forces, the results will be very nearly zero, and therefore they will not impose any significant loading on the bearings that support the cams. This is not true in the case of gear and epicyclic speed reducers with eccentric motions. The load sharing aspect of this invention eliminates highly concentrated loads that are eccentric to the axis of rotation and separation forces which must be reacted by the shaft and bearings that support them.

Another feature of this embodiment, is that it is irreversible. The speed reducers of this invention can be designed to be incapable of being driven backward, i.e., the normally driven cam would not be able to turn the normally drive cam. This can be seen in FIG. 8(b) inset. Rotation of driven cam would require ball B2 to move radially in or out in slot S2. This can only happen if enough tangential force were developed at the ball and cam interface at point B. Since this angle is very nearly 90° the tangential force required to rotate the cam is also very nearly zero and consequently there is little or no force available to turn the cam ball track 38 and in turn to drive the drive cam 16. This irreversible feature eliminates the need for brakes since the speed reducer of this embodiment is self-locking and will hold the load attached to the driven output shaft automatically in the stopped position.

Figure 9A:
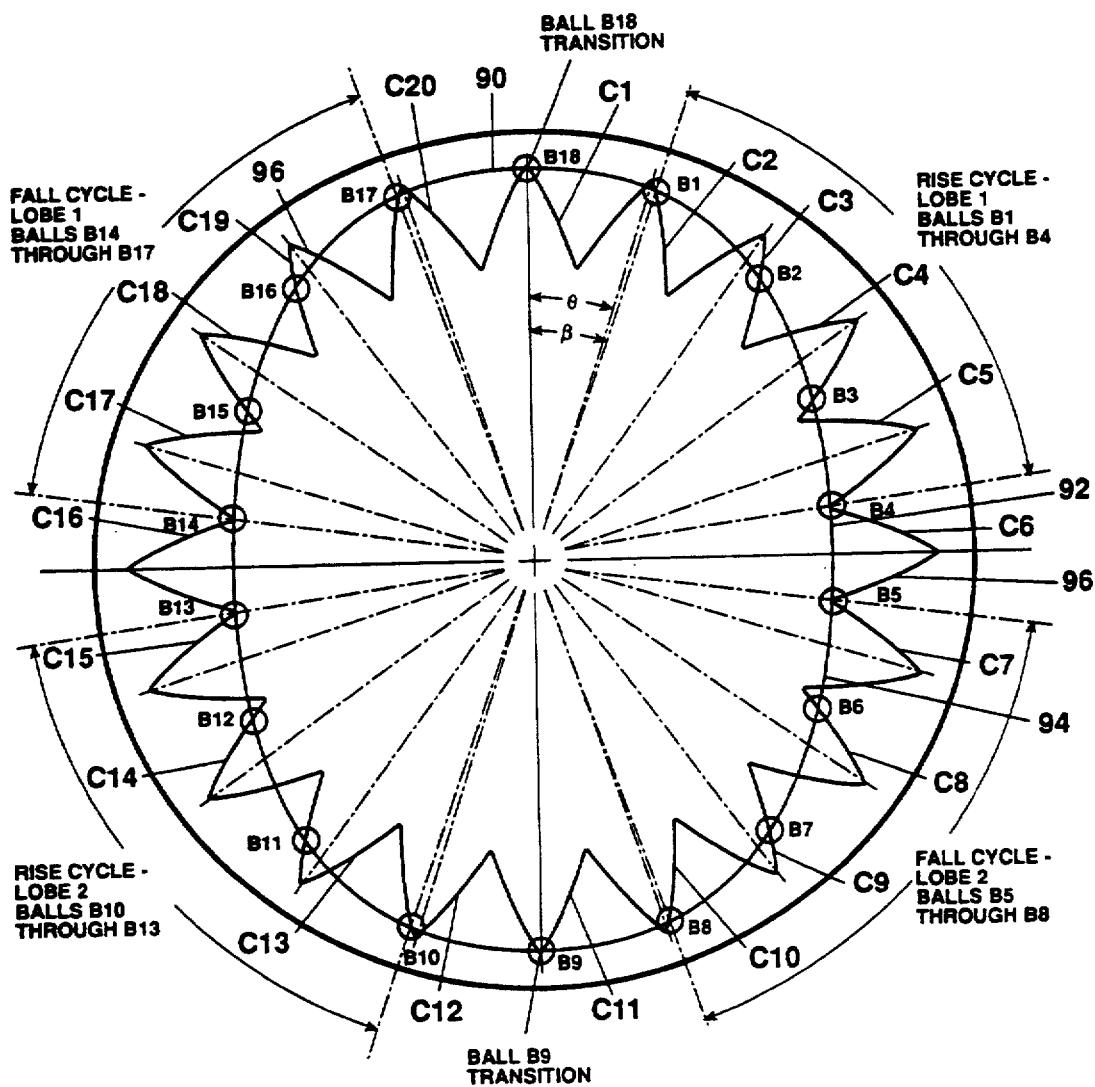
FIG. 9(a) is a superposition plan view of a two lobe drive cam and twenty cycle driven cam according to an embodiment of the present invention.
Figure 9B:
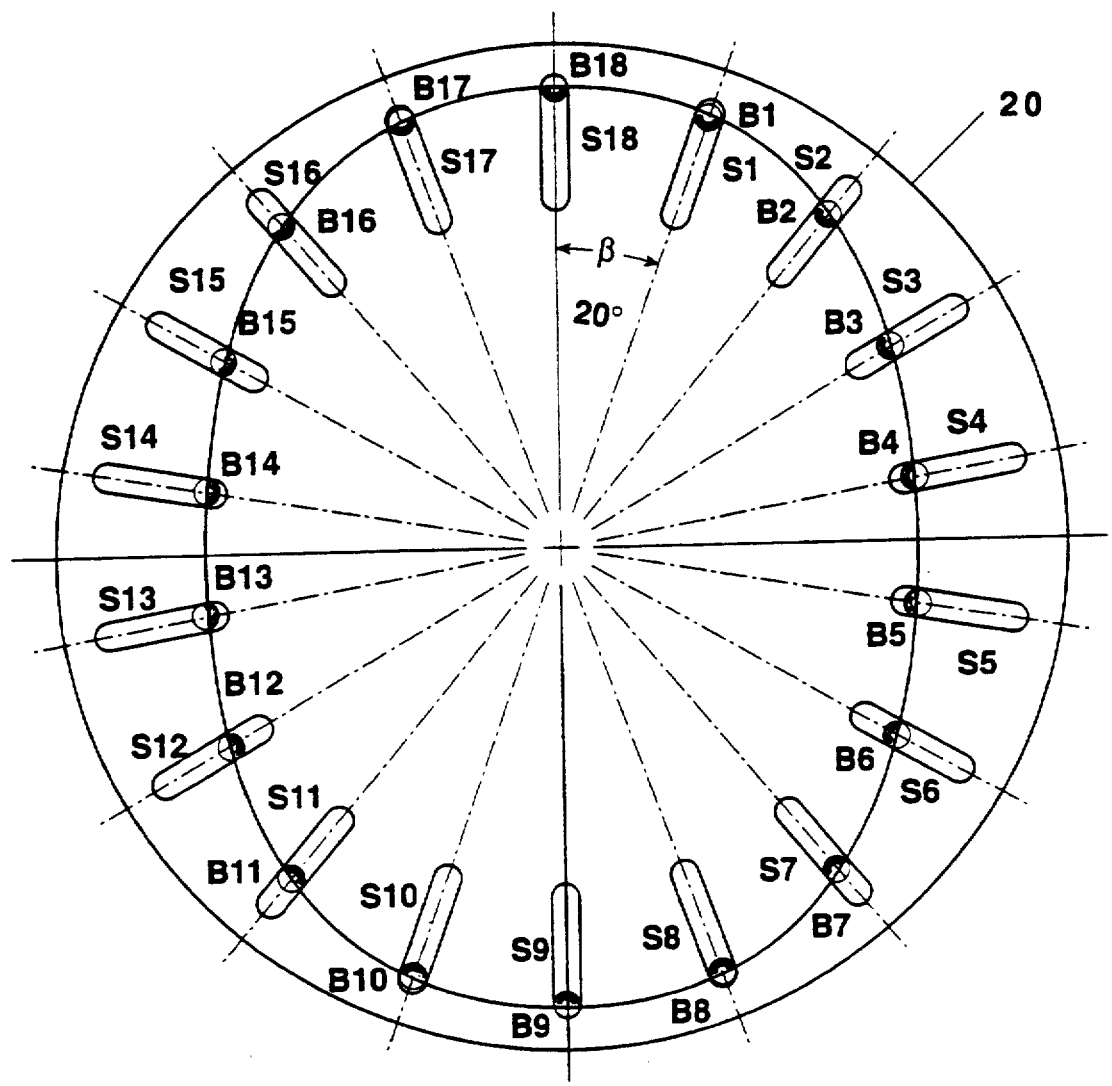
FIG. 9(b) is a plan view of a reaction disk showing ball and slot configuration in practice of the embodiment of FIG. 9(a).
Figure 9C:
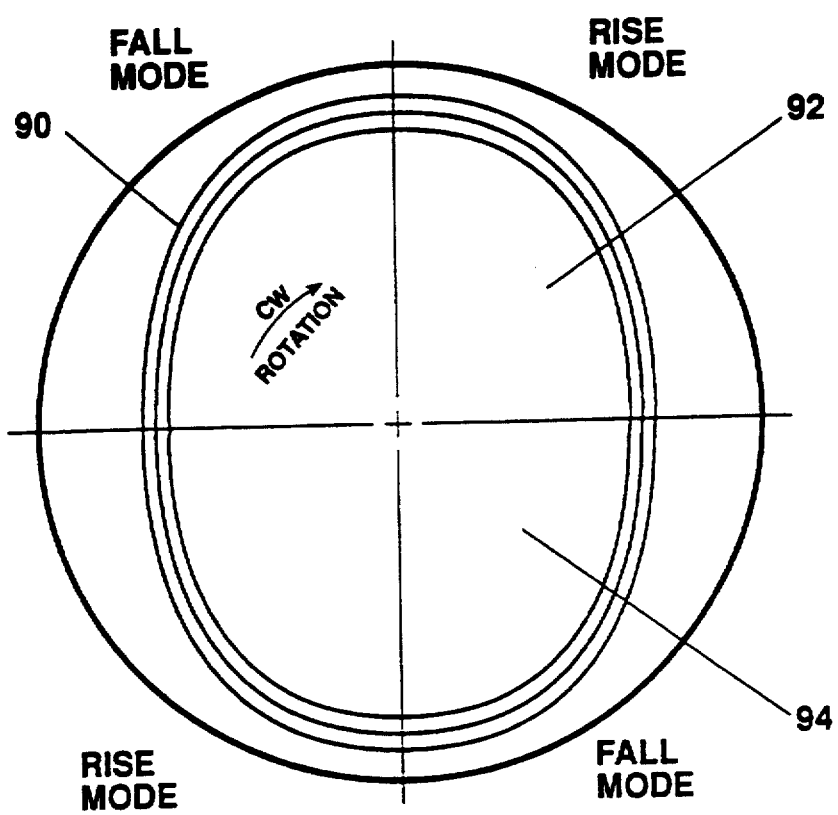
FIG. 9(c) is a Plan view of a two cycle drive cam according to an embodiment of the present invention.
Figure 9D:
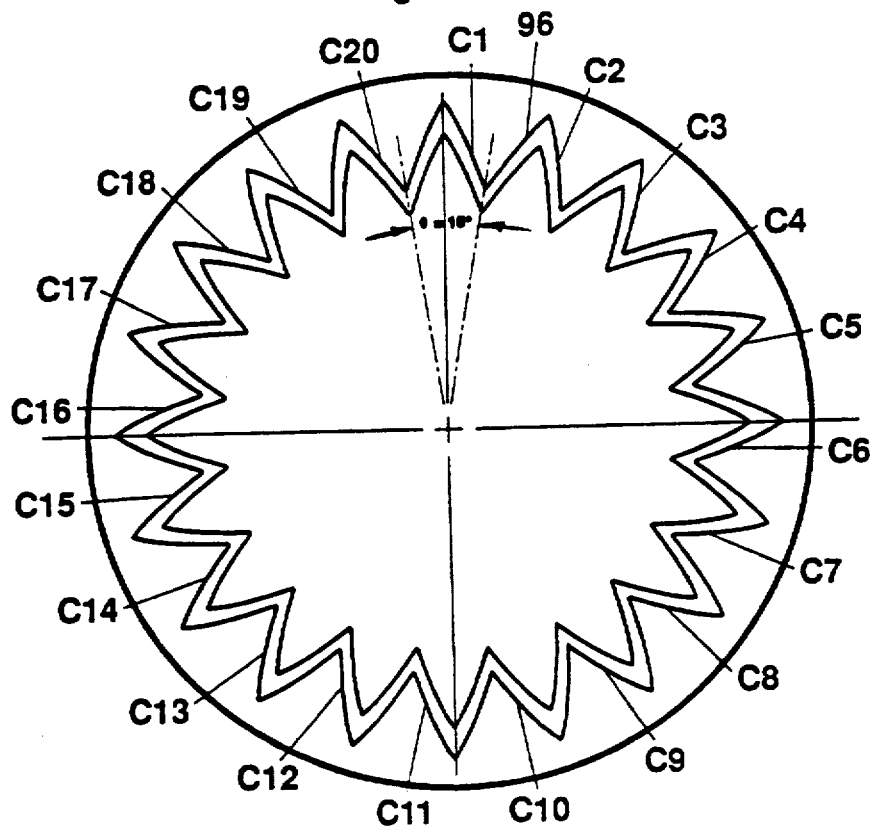
FIG. 9(d) is a plan view of a twenty cycle drive cam according to an embodiment of the present invention.

FIG. 9 (a,b,c,d) is an example of how a combination of a two lobe drive cam 90, FIG. 9(c), and a 20 cycle (C1–C20) driven cam 96, FIG. 9(d), react. (The speed ratio = 1/2/20 = 10:1; The number of balls = 20 − 2 = 18.) Balls B9 and B18 are in transition; balls B1–B4 are on the rise cycle of the first lobe 92 of drive cam 90; and balls B14–B17 are on the fall cycle of the first lobe 92. Balls B10–B13 are on the rise cycle of the second lobe 94 of cam 90; and balls B5–B8 are on the fall cycle of second lobe 94.

For the twenty lobe driven cam 96, FIG. 9(d), the subtended angle $\theta$ for each cycle is 18° (360/20) The ball slot angle $\beta$ is 20° (360°/20−2). FIG. 9(c) shows a two lobe cam track 90 with lobe 1, 92, and lobe 2, 94. For the configuration shown in FIG. 9(a), in cam track 96, cycles C6 and C16 do not contain balls to react with cam track 90 of the drive cam. There is one ball less than the number of cycles in cam 96 for each lobe of the drive cam, 90, (9 balls per lobe). This fulfills the requirement of no more than one ball per cycle. Balls B9 and B18 are in transition. FIG. 9(b) shows slots S1 to S18 spaced the angle $\beta$ (20°), in reaction disk 20.

Figure 10A:
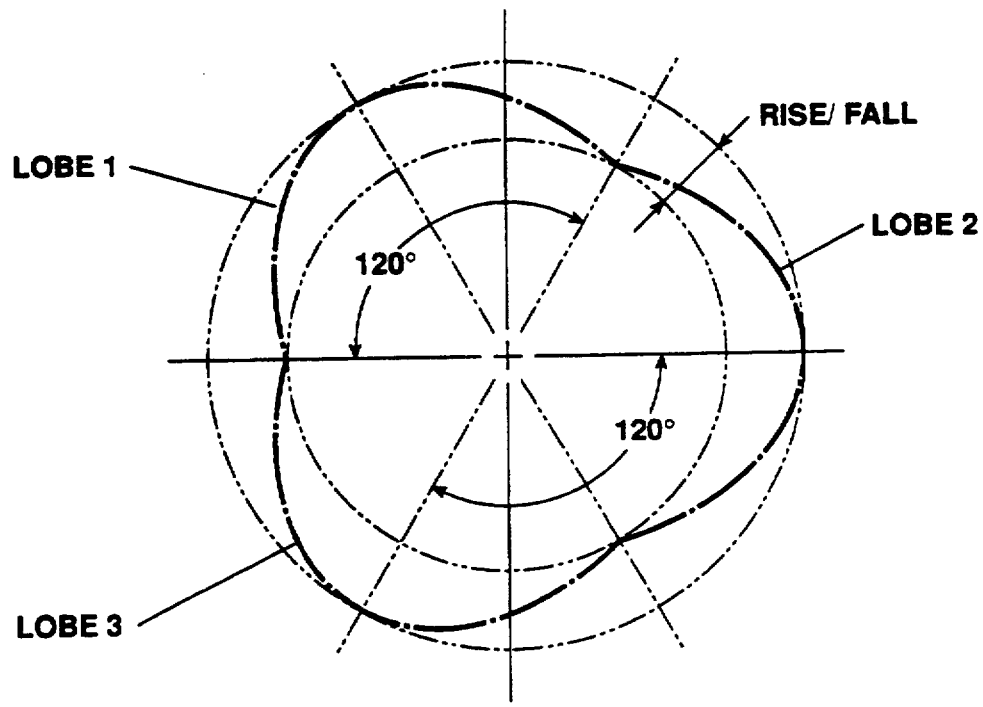
FIG. 10(a) is a Plan view of a three lobe drive cam according to an embodiment of the present invention.
Figure 10B:
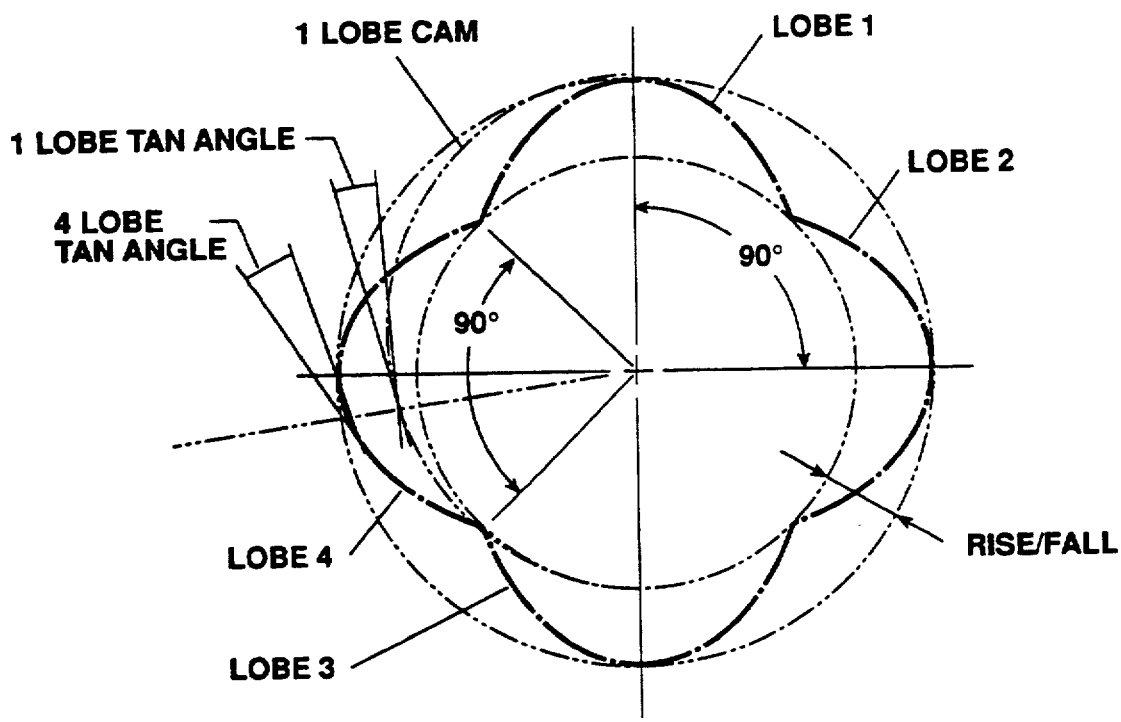
FIG. 10(b) is a plan view of a four lobe drive cam with a 180° single lobe drive cam superimposed according to an embodiment of the present invention.

It can be seen from FIG. 10(a,b) that as the number of lobes on the drive cam increases, 3 lobes (FIG. 10(a)), and 4 lobes (FIG. 10(b)), the rise and fall reflect larger TAN angles. This indicates that some combinations of lobes and cam diameters can produce assemblies of this invention that can be backdriven. The TAN angle must be sufficiently large to produce a tangential force that is large enough to overcome the friction and inertia of the drive load (e.g., the motor). In FIG. 10(b), the four lobe cam has superimposed on it a 180° portion of a one lobe cam to illustrate the significant change possible in angle. Further extrapolation on rise and fall amount, number of lobes and cam diameter will produce the combinations that can achieve reversibility, or assemblies of this invention that can be used as speed increasers.

Figure 11:
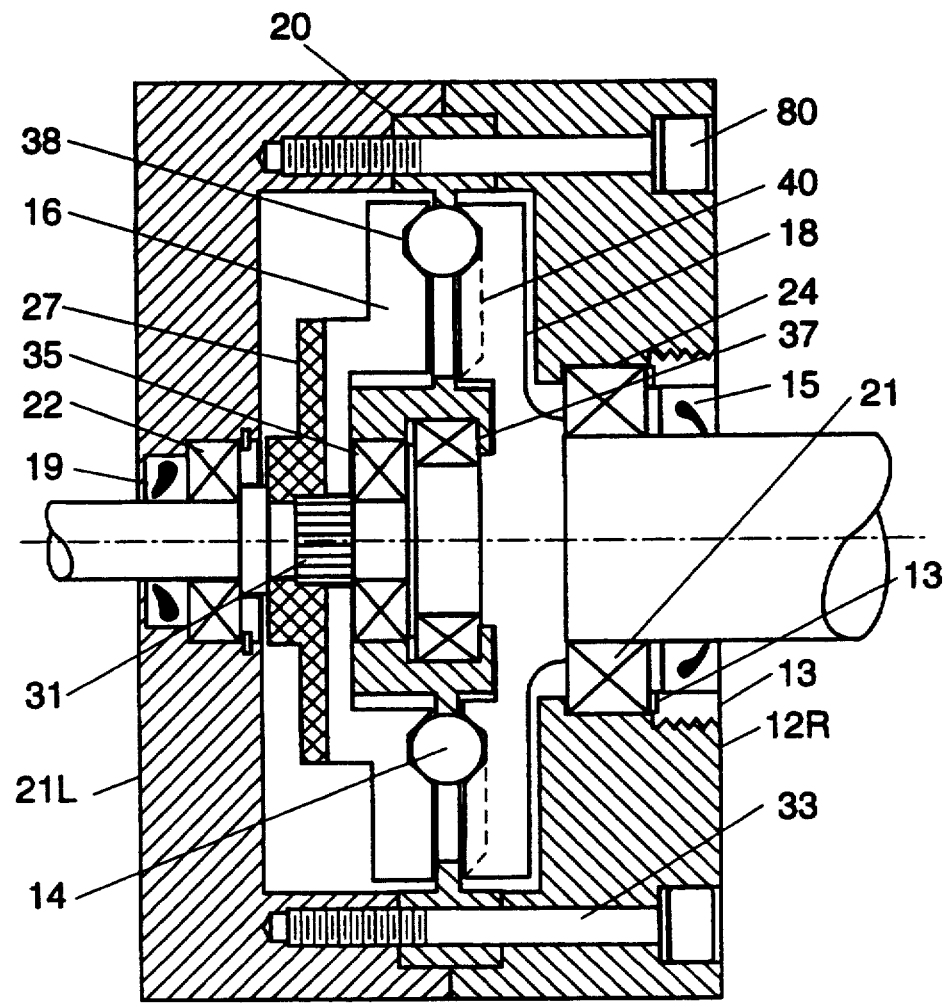
FIG. 11 is a section view of enhanced design of an embodiment of the present invention.

A further evolution of the invention is shown in FIG. 11, and is a further refinement of the preload function and shaft support described in the assembly of FIG. 2(b). The embodiment shown provides two bearings in the reaction disk that will be more effective in the support of the two shafts and more control in the application of preload.

In the case of shaft support bearings 37 and 24, they provide a moment capability to react any moment loading applied to the assembly from the cantilevered output shaft. This eliminates duplex bearings and provides a more precise alignment of the two shafts during operation. Bearings 22 and 35 Provide a Precise alignment of the input shaft. The alignment of the two shafts is assured by line boring the four bearing bores in the assembled state of the housing. The reaction disk can easily accommodate the imposed loadings since the internal loading will be transmitted to and reacted by pin 33.

Shim 21, along with the loading nut 11, preloads the assembly. The shim can be ground to the proper thickness for the final preload requirement. The shim can be replaced at any time to either change the preload or make up for wear that may have introduced backlash. This preload technique combined with the multiple number of balls sharing the load can essentially reduce all backlash to where it would be unmeasurable.

Another embodiment of the present invention is illustrated in FIG. 12 (a,b,c,d). The design principal of this assembly 190 is the use of cylindrical cam tracks with ball actuation in an axial line parallel to the axis of rotation, instead of the radial ball actuation perpendicular to the axis of rotation in the embodiment earlier presented The drive member 100 includes a cylindrical barrel cam 102, FIG. 12(b), which is machined into its external diameter. As in the case of the face cam embodiment, the pitch of the cam is such that for 180° rotation of the drive member, the ball will move axially in a slot 130 of reaction cylinder 120 at a rate that is proportional to the 180° rotation of the drive member 102. This rotation will axially displace every ball in each of the slots 130 of the reaction cylinder the same amount for each degree of rotation of drive member 102. The multi-cycle driven cam member 110 has an internal cam track 112, FIG. 12(d), whose curvature for each cycle is developed to produce a straight line loci of points during its interaction with the drive cylindrical cam 100, and balls 114. This straight line loci of points is axial and parallel to the centerline of the shaft. Balls 114 are installed through the loading ports 160. The conjugate action of these cam tracks produces a constant angular rotation at the designed speed reduction from the drive input member 104, to the driven output member 110.

The reaction cylinder 120 performs the same function as the reaction disk of the face cam design. FIG. 12(c) shows the reaction cylinder with the axial slots 130, and FIG. 12(a) shows it fixed to the housing 128. A bearing can be installed in the drive member 100 for shaft continuity similar to the way it is installed in the assembly of FIG. 2(b). In summary, this embodiment will do with cylindrical cams what the face cam design of the earlier invention accomplishes. All the principals developed and described therein are applicable in this embodiment.

Figure 13:
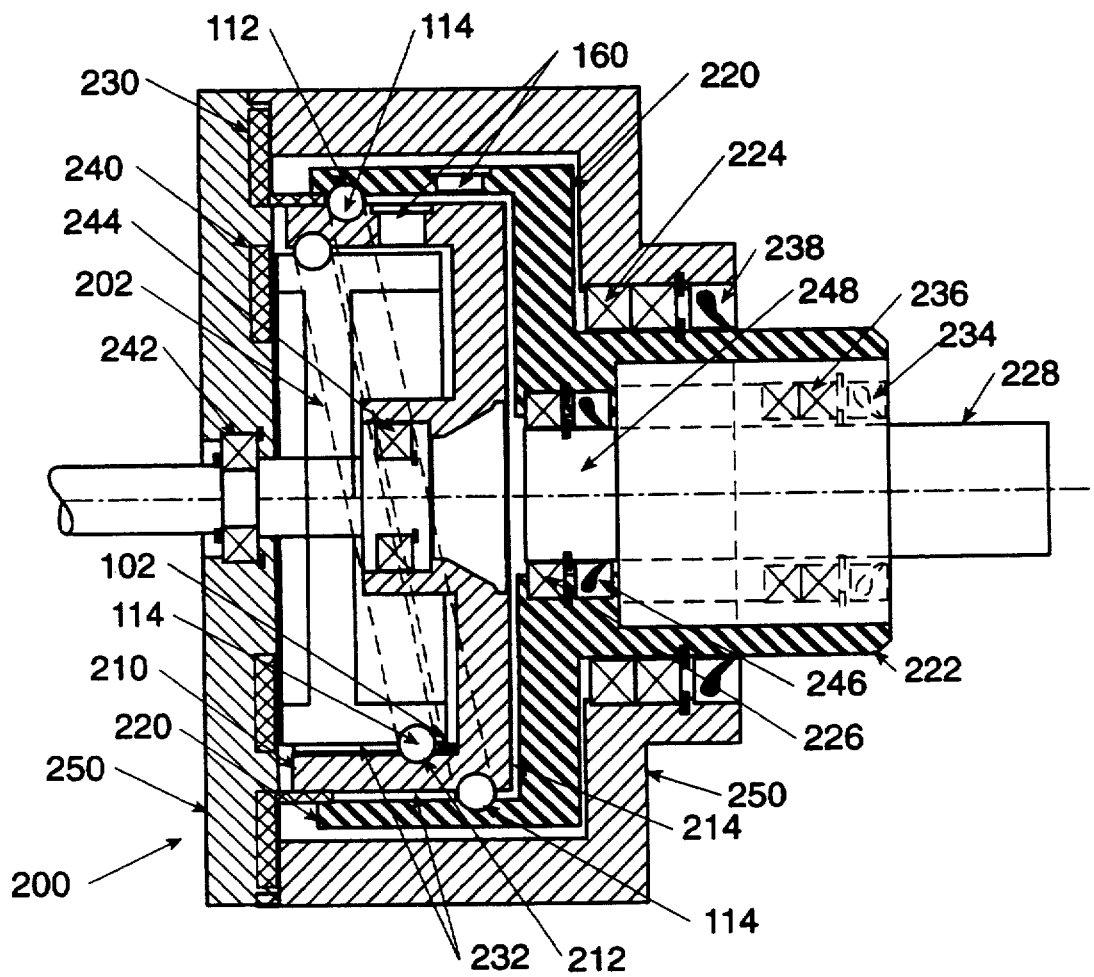
FIG. 13 is a side view of a multi-stage embodiment of the invention of FIG. 12.

In an alternative embodiment of the cylindrical cam design, higher speed ratios are obtained by utilizing various numbers of interim cylindrical cams and shown as assembly 200, FIG. 13. Essentially, assembly 200 is a combination of two of the single stage reducers of assembly 190, FIG. 12(a). More particularly, speed reducer assembly 200 includes a drive member 202, an interim member 210, and driven member 220. Drive member 202 and driven member 220 may be configured as described earlier, i.e., members 100 and 110 in FIGS. 12(b) and 12(d), including having a respective drive cam 102 and driven cam 112. A first internal cam of interim member 210 is provided with a driven cam 212, configured as desired and perhaps such as cylindrical cam 112. A second cam 211 which is on interim cam drum outside diameter 210, with a drive cam 214, configured as desired and perhaps such as like cam 102. This creates a two stage combination of a paired drive cam and driven cam (first stage), and a second paired drive cam and driven cam (second stage) with balls 114 interposed between them and rolling in slots 232 of the reaction cylinders 230 and 240. The balls are inserted through loading ports 160. Hence each interim cylindrical cam provides an additional stage of reduction. The speed reduction ratio (SR) is determined in the same manner as in the multi-stage reducers of the face cam invention earlier Presented. It is therefore possible to achieve an almost unlimited range of speed reduction in practice of this invention by utilizing multiple stages of these paired cams.

The output shaft 222 of driven member 220 is supported in bearings 224. A second shaft 228, in an alternate design, is shown concentric with output shaft 222, and supported in bearings 226 and 236. The two concentric shafts, 222 and 228, turning at different speeds, are available to transmit rotary motive forces at the same time or independently. With each additional stage, another concentric shaft becomes available so that with several concentric shafts, each turning at appropriate speeds, and with the proper coupling to the drive shaft, this embodiment could be the basis of a new automobile transmission.

It will now be appreciated that a speed converter made in accordance with the teachings of the present invention will have a ratio of drive cam(s) to driven cam(s) of other than unity (less than for reduction, more than for increasing). This invention has a multiplicity of applications, including: automotive transmissions, robotics applications, elevation drives, and the like. Various modifications of the specific embodiments set forth above are also within the spirit and scope of the invention. Furthermore, a translation device with other than constant angular velocity may be developed for special applications. Nevertheless, the scope of these and other embodiments is limited only as set forth in the following claims.

I claim:

1. Apparatus for converting angular velocity and rotary motive force of an input drive device to angular velocity and rotary motive force of an output driven device, said input and output devices disposed to be coupled together by and to interact via a plurality of interacting elements, said apparatus comprising a conjugate pair of devices rotatable about a common axis, a first device of said pair being an input device having drive cam means for supply of angular velocity and rotary motive force to a second device of said pair, said second device being an output driven device having a driven cam means for receipt of said angular velocity and rotary motive force from said drive cam means, means for translating, said translating means including a retainer having a plurality of radial slots, each said slot adapted to receive therein an assigned one of a plurality of interacting elements, a majority of said interacting elements comprising in-motion interacting elements and being put in oscillatory motion in said slots by said drive cam means, said retainer being located between said conjugate pair about said common axis, and said drive cam means cooperating with said translating means and said driven cam means for transmitting said angular velocity and rotary motive force of said input device substantially equally and simultaneously through all said oscillating in-motion interacting elements, for obtaining said angular velocity and rotary motive force of said output driven device.

2. The apparatus of claim 1 wherein said apparatus has an input shaft and an output shaft, wherein said conjugate pair and translating means comprise a first stage having an input and an output, said input shaft being coupled to said input of said first stage and further comprising a second stage having an input and an output, wherein said output of said first stage is coupled to said input of said second stage and said output of said second stage is coupled to said output shaft, said second stage comprising a second conjugate pair of devices rotatable about said common axis and having a corresponding translating means for transmitting angular velocity and rotary motive force from said second stage input to said second stage output.

3. The apparatus of claim 1 wherein said retainer comprises a reaction disk and is fixed in relation to said common axis.

4. The apparatus of claim 1 wherein said driven cam means comprises a driven cam having multiple cycles, ones of said cycles subtending an angle $\theta$, wherein said radial slots are separated by an angle $\gamma$, and wherein angle $\gamma$ is greater than angle $\theta$.

5. The apparatus of claim 4 wherein said drive cam means comprises at least one non-circular drive cycle and wherein a minimum said angle $\gamma$ is computed as $$\gamma = \frac{360°}{\text{no. of cycles in driven cam } - \text{ no. of cycles in drive cam}}.$$

6. The apparatus of claim 1 wherein a speed ratio (SR) for said apparatus is determined, for said drive cam means comprising (W) cycles and said driven cam means comprising (Z) cycles, as follows:

$$SR = \frac{1}{W/Z}.$$

7. The apparatus of claim 5 wherein said drive cam means comprises a rotatable drive cam, wherein rotation of said drive cam displaces said in-motion interacting elements along said slots an essentially equal amount at essentially the same linear velocity for any amount of said drive cam rotation, and wherein said drive cam via said in-motion interacting elements rotates said driven cam an equal angle at each of said in-motion interacting elements.

8. The apparatus of claim 1 wherein said drive cam means comprises a face cam having a drive cam track and said driven cam means comprises a face cam having a driven cam track.

9. The apparatus of claim 8 further comprising at least one interim cam having a first and a second face, wherein said first face of said interim cam interacts with said face cam of said drive cam means, and said second face of said interim cam interacts with said face cam of said driven cam means.

10. The apparatus of claim 9 wherein said driven cam track comprises (W) cycles, said interim cam first face comprises (Y) cycles, said interim cam second face comprises (X) cycles and said driven cam track comprises (Z) cycles, wherein the speed reduction (SR) ratio for said apparatus is determined according to the following formula:

$$SR = \frac{1}{W/X \times Y/Z}.$$

11. The apparatus of claim 1 wherein said apparatus comprises a vehicular transmission wherein said driven cam means comprises a driven cam having multiple cycles, ones of said cycles subtending an angle $\theta$, wherein said radial slots are separated by an angle $\gamma$, and wherein angle $\gamma$ is greater than angle $\theta$.

12. Apparatus for converting angular velocity and rotary motive force of an input drive device of a rotary input to angular velocity and rotary motive force of an output driven device, said input and output devices disposed to be coupled together by and to interact via at least one interacting element, said apparatus comprising a reaction disk having at least one radial slot and at least one interacting element for straight line travel in said slot, a conjugate pair of cam device rotatable about a common axis, a first of said pair being an input drive cam device for supply of angular velocity and rotary motive force, and a second device of said pair being an output driven cam device, said drive cam device having at least one drive cycle, and said at least one interacting element being put in oscillatory motion in said slot by said at least one drive cycle cooperating with said driven cam device, the loci of the centers of said interacting element in said oscillatory motion defining essentially a straight line and traveling at essentially constant linear velocity in said slot during engagement of said in-motion element by said drive and driven cam devices, for converting said angular velocity and rotary motive force of said input drive device to said angular velocity and rotary motive force of said output driven device.

13. Apparatus of claim 12 wherein said conjugate pair of devices is a conjugate pair of cylindrical devices for mounting concentrically to said common axis, wherein said at least one drive cycle comprises a substantially constant interacting-element-displacement drive flank for contacting and displacing said at least one interacting element.

14. The apparatus of claim 13 wherein said input drive cam device comprises a rotatable drive cam, and further comprising a plurality of in-motion interacting elements, said reaction disk comprising a plurality of slots for receipt of respective ones of said elements, wherein rotation of said drive cam device displaces said in-motion interacting elements axially along said slots an essentially equal amount at essentially the same liner velocity for any amount of said rotation, wherein said output driven cam device comprises a rotatable driven cam, and wherein said rotation of said drive cam device, via said inmotion interacting elements, rotates said driven cam device an equal angle at each of said in-motion interacting elements with rotary motive force applied substantially equally and simultaneously through all said in-motion interacting elements.

15. The apparatus of claim 12 wherein said input drive cam device comprises a rotatable drive cam, further comprising a plurality of in-motion interacting elements, said reaction disk comprising a plurality of slots for receipt of said elements, wherein rotation of said drive cam device displaces said in-motion interacting elements radially along said slots an essentially equal amount at essentially the same linear velocity for any amount of said drive cam rotation, wherein said output driven cam device comprises a rotatable driven cam, and wherein said drive cam via said in-motion interacting elements rotates said driven cam an equal angle at each of said in-motion interacting elements.

16. A method for converting angular velocity and rotary motive force of an input drive part to angular velocity and rotary motive force of an output driven part of a rotary machine, comprising the steps of providing a conjugate pair of devices rotatable about a common axis, a first device of said pair being an input cam device and a second device of said pair being an output cam device, forming said input cam with a non-circular drive cycle, providing translating means including a retainer having a plurality of slots for radial translation of an interacting element in each slot, ones of said interacting elements being in-motion interacting elements and being put in oscillatory motion by said input device, said retainer being located between said conjugate pair about said common axis, said translating means being for transmitting angular velocity and rotary motive force of a first of said devices to angular velocity and rotary motive force of a second of said devices, said first of said devices for interacting with an input of said translating means and said second of said devices for reacting with an output of said translating means, wherein said input device cooperates with said output device and said translating means for translating through all said in-motion interacting elements, and moving said oscillating in-motion interacting elements via said drive cycle essentially simultaneously and at uniform speed for translating said angular velocity and rotary motive force of said input device to said angular velocity and rotary motive force of said output device.

17. The method of claim 16 wherein said input cam device comprises a drive cam and said output cam device comprises a driven cam, and further comprising the steps of rotating said drive cam and displacing said in-motion interacting elements along said slots an essentially equal amount at essentially the same linear velocity for any amount of said drive cam rotation, and rotating said driven cam via said in-motion interacting elements by an equal angle at each of said in-motion interacting elements.

* * * * *

UNITED STATES PATENT AND TRADEMARK OFFICE
CERTIFICATE OF CORRECTION

PATENT NO. : 5,312,306

DATED : May 17, 1994

INVENTOR(S) : Frank A. Folino

It is certified that error appears in the above-identified patent and that said Letters Patent is hereby corrected as shown below:

On the title page, showing the illustrative figure 5b, should be deleted and substitute therefor the attached title page.

The drawing sheet consisting of Fig 5b, should be deleted and replaced with the drawing sheet, consisting of Fig. 5b.

United States Patent [19]

Folino

[11] Patent Number: 5,312,306
[45] Date of Patent: May 17, 1994

[54] SPEED CONVERTER

[75] Inventor: Frank A. Folino, Westin, Mass.

[73] Assignee: Synkinetics, Inc., Lexington, Mass.

[21] Appl. No.: 670,263

[22] Filed: Mar. 14, 1991

[51] Int. Cl.⁵ ............................................. F16H 13/08
[52] U.S. Cl. ......................................... 475/196; 476/36
[58] Field of Search ............. 74/63, 202, 206, 216.3, 74/465; 475/183, 196; 476/36, 67, 68

[56] References Cited

U.S. PATENT DOCUMENTS

| | | | |
|---|---|---|---|
| 2,512,272 | 6/1950 | Gull | 74/63 |
| 3,039,324 | 6/1962 | Waterfield | 74/63 X |
| 3,049,019 | 8/1962 | LaPointe et al. | 74/202 |
| 3,468,175 | 9/1969 | Rabek | 74/63 |
| 3,807,243 | 4/1974 | Yada | 74/63 |
| 4,584,904 | 4/1986 | Distin, Jr. et al. | 74/63 X |
| 4,643,047 | 2/1987 | Distin et al. | 74/63 X |
| 4,960,003 | 10/1990 | Hartley | 74/63 |
| 5,016,487 | 5/1991 | Bollmann | 74/206 |

FOREIGN PATENT DOCUMENTS

| | | | |
|---|---|---|---|
| 24020 | 2/1922 | France | 74/63 |
| 1021945 | 2/1953 | France | 74/63 |
| 59-133863 | 8/1984 | Japan | 475/196 |
| 59-180153 | 10/1984 | Japan | 74/63 |
| 0168954 | 9/1985 | Japan | 475/196 |
| 629387 | 9/1978 | U.S.S.R. | 74/206 |
| 1257331 | 9/1986 | U.S.S.R. | 475/196 |
| 1368545 | 1/1988 | U.S.S.R. | 475/196 |
| 1399548 | 5/1988 | U.S.S.R. | 475/196 |
| 1490362 | 6/1989 | U.S.S.R. | 74/206 |
| 1569470 | 6/1990 | U.S.S.R. | 475/196 |

OTHER PUBLICATIONS

Mechanical Engineering and Technology Guide, Balls Reduce Speed and Transmit Torque.
Dojen TM Precision Rotary Actuator Designer's Guide, Div. of Lenze, Woburn, Mass.
Soviet Engineering Research Jun. 1986, vol. 66, Issue 2, pp. 24–28.
Japanese patent, A, 60-179563, Sep. 1985, abstract.
Japanese patent, A, 60-129462, Jul. 1985, abstract.
Japanese patent, A, 2253037, Oct. 1990, abstract.
Japanese patent, A, 60-146954, Aug. 1985, abstract.
Japanese patent, A, 60-4663, Jan. 1985, abstract.

*Primary Examiner*—Leslie A. Braun
*Assistant Examiner*—Khoi Q. Ta
*Attorney, Agent, or Firm*—James E. Maslow

[57] ABSTRACT

A method and apparatus are provided for translating the speed of a drive shaft which is driven at a first speed to the speed of a driven shaft at a second speed, by providing a drive cam, a driven cam, and at least one reciprocating transfer element driven at a constant angular velocity and held in a slotted, fixed retainer, for interacting the two cams, such that the driven cam can be driven at the second speed by the drive cam driven at the first speed.

17 Claims, 23 Drawing Sheets

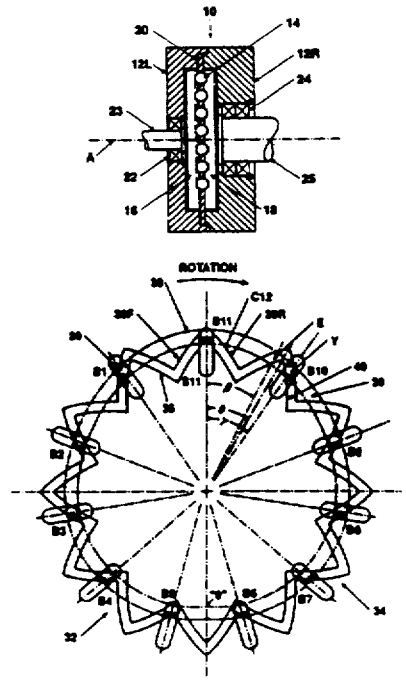

UNITED STATES PATENT AND TRADEMARK OFFICE
CERTIFICATE OF CORRECTION

PATENT NO. : 5,312,306

DATED : May 17, 1994

INVENTOR(S) : Frank A. Folino

It is certified that error appears in the above-identified patent and that said Letters Patent is hereby corrected as shown below:

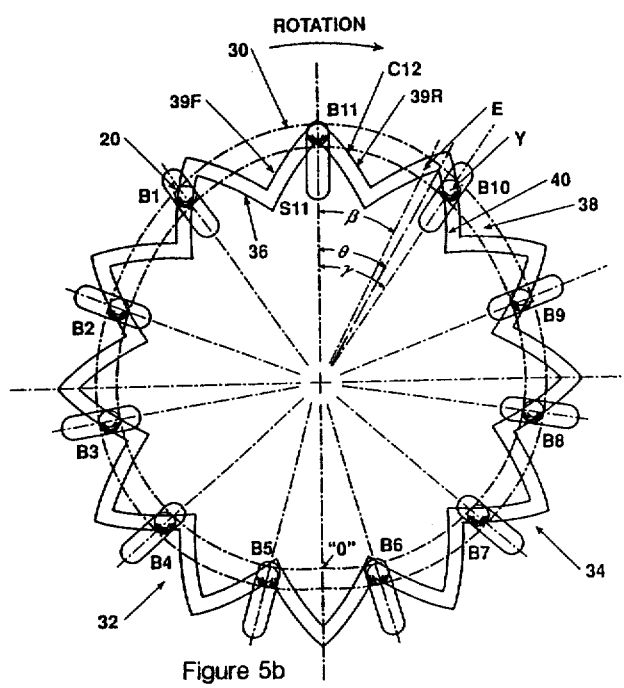

Figure 5b

UNITED STATES PATENT AND TRADEMARK OFFICE
CERTIFICATE OF CORRECTION

PATENT NO. : 5,312,306

DATED : May 17, 1994

INVENTOR(S) : Frank A. Folino

It is certified that error appears in the above-identified patent and that said Letters Patent is hereby corrected as shown below:

Col 3, line 5, col 4, lines 35 and 39. col 10, lines 59 and 60, col 11, line 18, "3(a)" should read --2--. Col 3, line 6, col 4, lines 35 and 47, col 10, lines 59 and 62, col 11, line 29, "3(b)" should read --3--. Col 3, line 16. insert after "of the" the phrase --multi-stage embodiment of FIGURE 6(a).--. Col 3, lines 37 and 41, "Plan" should read --plan--. Col 4, line 16, "cam 38" should read --member 16--; line 18, "cam 40" should read --member 18--; line 31, "Power" should read --power--; line 41, "rise" should read --fall--; lines 42 and 43, after "cam" insert --for a clockwise rotation--; line 43, "fall" should read --rise--; line 43, "symmetric" should read --asymmetric--. Col 5, line 21, insert after "lobes" the term --or cycles--; line 49, "B" to -- $\beta$ --; Col 5, line 51, "Y" to - $\gamma$ --. Col 6, line 29, "12the" should read --12th--. Col 7, line 66, "Percentage" should read --percentage--. Col 8, line 61, "Provided" should read --provided--. Col 9, line 41, insert before "highly localized" the term --significantly reduce--. Col. 10, line 60, col 12, line 5, col 12, line 27, col 13, line 60, and col 14, line 7, "38" should read --30--. Col 11, line 6, insert after "side" the term --32--; lines 6 and 10, change "track 32" to --30--; lines 13, 14, 22 and 26, "cam" should read --member--; line 23, "cam" should read --ball--; line 36, insert after "segment" the term --or mode--; lines 39 and 40, "a" should read --a$_1$--. Col 11, line 42, col 13, line 39, col 14, lines 46, 60 and 64 and col 15, line 11, "cam" should read --ball--. Col 11, line 42, "36" should read --40--; line 43, "18" should read --36--; line 53, "lob" should read --lobe--; line 56, "16" should read --30--. Col 12, line 11 and lines 42 and 43, "drive cam" should read --ball track--; line 13, "32" should be --30--; line 14, before "39F" insert --fall mode--; line 26, "cycle" should read --segment or mode--. Col 13, lines 10, 12 and 60, and col 14, line 7, "drive cam" should read --ball track--. Col 13, line 11, "Point" should read --point--. Col 13, line 1 (second occurrence), col 13, line 39 and col 15, line 43, "cam" should read --ball--. Col 14, line 15, "Positions" should read --positions--; lines 35, 36 and 45 insert after "cam" the term--member--; line 41, "cams" should read--cam members--. Col 15, line 6, change "20" to --12--; line 30, change "40" to --36--. Col 16, lines 16 and 17, "track" should be deleted, and line

UNITED STATES PATENT AND TRADEMARK OFFICE
CERTIFICATE OF CORRECTION

PATENT NO. : 5,312,306
DATED : May 17, 1994
INVENTOR(S) : Frank A. Folino

It is certified that error appears in the above-identified patent and that said Letters Patent is hereby corrected as shown below:

52, "Provide a Precise" should read --provide a precise--. Col 17, line 60, "Presented" should read --presented--. Claim 7 line 1, "5" should read --4--. Claim 10, line 1, "driven" should read --drive--. Claim 12, line 10, "device" should read --devices--.

Signed and Sealed this

Third Day of June, 1997

Attest:

BRUCE LEHMAN

Attesting Officer

Commissioner of Patents and Trademarks